(12) United States Patent
Tabata et al.

(10) Patent No.: US 11,333,063 B2
(45) Date of Patent: May 17, 2022

(54) CONTROL DEVICE FOR HYBRID VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Yasutaka Tsuchida, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/918,117

(22) Filed: Jul. 1, 2020

(65) Prior Publication Data
US 2021/0087966 A1 Mar. 25, 2021

(30) Foreign Application Priority Data
Sep. 20, 2019 (JP) .............................. JP2019-172309

(51) Int. Cl.
*F02B 37/12* (2006.01)
*F02D 41/14* (2006.01)

(52) U.S. Cl.
CPC ............ *F02B 37/12* (2013.01); *F02D 41/145* (2013.01); *F02D 41/1447* (2013.01); *F02B 2037/122* (2013.01); *F02D 2250/21* (2013.01)

(58) Field of Classification Search
CPC .. F02B 37/12; F02B 2037/122; F02D 41/145; F02D 41/1447; F02D 2250/21; F02D 31/006; F02D 41/0007; F02D 41/221; B60W 30/1884; B60W 30/1882; B60W 20/50; B60W 10/06; B60W 10/08; B60W 10/10; B60W 6/445; B60W 2510/0638; B60W 2510/081; B60W 2710/0666; B60W 2710/083
USPC ...................................................... 60/602.5
See application file for complete search history.

(56) References Cited

FOREIGN PATENT DOCUMENTS

JP 2008247205 A 10/2008

*Primary Examiner* — J. Todd Newton
(74) *Attorney, Agent, or Firm* — Hunton Andrews Kurth LLP

(57) ABSTRACT

When it is determined that there is a likelihood of occurrence of an abnormality in a supercharger, a maximum engine rotation speed and a maximum MG2 rotation speed are changed to a low rotation speed side and operating points of an engine and a rotary machine are controlled such that an engine rotation speed and an MG2 rotation speed are respectively within ranges which do not exceed the changed maximum rotation speeds. Accordingly, even when the supercharger does not operate normally and an abnormal increase in a supercharging pressure occurs, it is possible to curb a high-rotation state of the engine rotation speed and the MG2 rotation speed. As a result, even when an abnormal increase in the supercharging pressure occurs, it is possible to curb a decrease in durability of components.

7 Claims, 11 Drawing Sheets

| TRAVEL MODE | | | | C1 | B1 | MG1 | MG2 |
|---|---|---|---|---|---|---|---|
| EV | FORWARD/REVERSE | SINGLE-MOTOR DRIVE | DRIVE | | | G | M |
| | | | USE IN COMBINATION WITH ENGINE BRAKE | △ | △ | G | M |
| | | DOUBLE-MOTOR DRIVE | | ○ | ○ | M | M |
| HV | FORWARD | HIGH | | | ○ | G | M |
| | | LOW | | ○ | | G | M |
| | REVERSE | LOW | | ○ | | G | M |

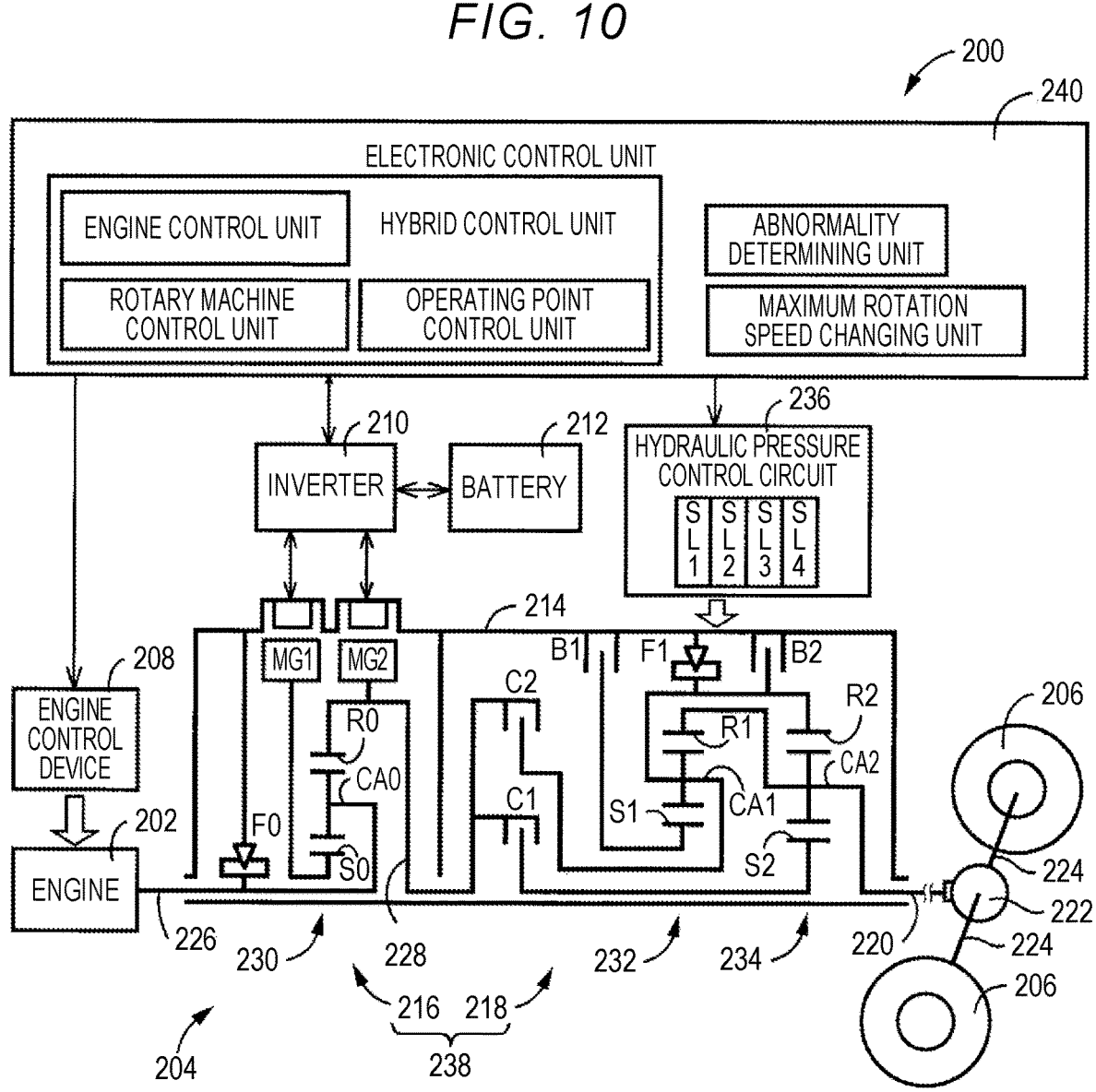

CONTROL DEVICE FOR HYBRID VEHICLE

CROSS-REFERENCE TO RELATED APPLICATION

This application claims priority to Japanese Patent Application No. 2019-172309 filed on Sep. 20, 2019, incorporated herein by reference in its entirety.

BACKGROUND

1. Technical Field

The present disclosure relates to a control device for a hybrid vehicle including an engine with a supercharger and a rotary machine.

2. Description of Related Art

A control device for a hybrid vehicle including an engine that serves as a power source for travel and a rotary machine that is connected to driving wheels in a power-transmittable manner is well known. An example is a vehicle described in Japanese Unexamined Patent Application Publication No. 2008-247205 (JP 2008-247205 A). JP 2008-247205 A discloses that an operating point of an engine is controlled such that a rotation speed of the engine is within a range which does not exceed a maximum rotation speed with a margin from a predetermined upper-limit rotation speed of the engine in view of protection of components.

SUMMARY

In the hybrid vehicle, performing control of an operating point of the rotary machine for the rotary machine such that a rotation speed of the rotary machine is within a range which does not exceed a maximum rotation speed with a margin from a predetermined upper-limit rotation speed of the rotary machine, in addition to control of the operating point of the engine, can be considered for the purpose of protection of components. On the other hand, when the engine includes a supercharger, there is a likelihood that the supercharger will not operate normally and an abnormal increase of a supercharging pressure from the supercharger will occur. Then, even when the operating points of the engine and the rotary machine are controlled such that the rotation speed of the engine and the rotation speed of the rotary machine are within a range which does not exceed the maximum rotation speeds thereof, the rotation speed of the engine or the rotation speed of the rotary machine may reach a high-rotation state in which it reaches the corresponding upper-limit rotation speed due to an abnormal increase of the supercharging pressure and there is concern of a decrease in durability of components.

The present disclosure provides a control device for a hybrid vehicle that can curb a decrease in durability of components due to a high-rotation state of of a rotation speed of an engine or a rotation speed of a rotary machine even when an abnormal increase of a supercharging pressure occurs.

According to a first aspect, there is provided a control device for (a) a hybrid vehicle including an engine with a supercharger that serves as a power source for travel and a rotary machine that is connected to driving wheels in a power-transmittable manner, the control device including: (b) an operating point control unit configured to control operating points of the engine and the rotary machine such that a rotation speed of the engine is within a range which does not exceed a maximum rotation speed of the engine with a margin of the rotation speed of the engine from a predetermined upper-limit rotation speed of the engine and a rotation speed of the rotary machine is within a range which does not exceed a maximum rotation speed of the rotary machine with a margin of the rotation speed of the rotary machine from a predetermined upper-limit rotation speed of the rotary machine; (c) an abnormality determining unit configured to determine whether an abnormality has occurred in the supercharger; and (d) a maximum rotation speed changing unit configured to change the maximum rotation speed of the engine and the maximum rotation speed of the rotary machine to a lower rotation speed side when it is determined that there is a likelihood of occurrence of an abnormality in the supercharger before it is determined that an abnormality has occurred in the supercharger than before it is determined that there is a likelihood of occurrence of an abnormality in the supercharger.

A second aspect of the present disclosure provides the control device for a hybrid vehicle according to the first aspect, wherein the maximum rotation speed changing unit is configured to increase an amount of change for changing the maximum rotation speed of the engine and the maximum rotation speed of the rotary machine to the lower rotation speed side as the likelihood of occurrence of an abnormality in the supercharger increases.

A third aspect of the present disclosure provides the control device for a hybrid vehicle according to the first or second aspect, further including an engine control unit configured to perform fuel-cut control for stopping supply of fuel to the engine when it is determined that an abnormality has occurred in the supercharger.

A fourth aspect of the present disclosure provides the control device for a hybrid vehicle according to the third aspect, further including a rotary machine control unit configured to perform rotary machine torque decrease control for decreasing an output torque of the rotary machine when it is determined that an abnormality has occurred in the supercharger.

A fifth aspect of the present disclosure provides the control device for a hybrid vehicle according to any one of the first to fourth aspects, wherein the abnormality determining unit is configured to determine whether an abnormality has occurred in the supercharger based on at least one of a rate of change of a supercharging pressure from the supercharger and a supercharging pressure difference between the supercharging pressure and a target value of the supercharging pressure.

A sixth aspect of the present disclosure provides the control device for a hybrid vehicle according to the fifth aspect, wherein the abnormality determining unit is configured to determine whether an abnormality has occurred in the supercharger based on the rate of change of the supercharging pressure and the supercharging pressure difference, and wherein the abnormality determining unit is configured to determine whether a first abnormality in which the rate of change of the supercharging pressure exceeds a predetermined rate of change has occurred and whether a second abnormality in which the supercharging pressure difference exceeds a predetermined supercharging pressure difference has occurred, to determine that an abnormality has occurred in the supercharger when it is determined that both the first abnormality and the second abnormality have occurred, and to determine that there is a likelihood of occurrence of an abnormality in the supercharger when it is determined that only one of the first abnormality and the second abnormality has occurred.

A seventh aspect of the present disclosure provides the control device for a hybrid vehicle according to any one of the first to sixth aspects, wherein the operating point control unit is configured to change the operating point of at least one of the engine and the rotary machine such that the rotation speed of the engine and the rotation speed of the rotary machine are within a range which does not exceed the corresponding maximum rotation speed when at least one of the rotation speed of the engine and the rotation speed of the rotary machine exceeds the corresponding maximum rotation speed due to change of the maximum rotation speed of the engine and the maximum rotation speed of the rotary machine to a lower rotation speed side, and wherein the operating point control unit is configured to change the operating point of at least one of the engine and the rotary machine by performing at least one of engine torque decrease control for decreasing an output torque of the engine, rotary machine torque decrease control for decreasing an output torque of the rotary machine, and gear shifting control for shifting an automatic transmission constituting a part of a power transmission path between the engine and the rotary machine and the driving wheels.

According to the first aspect of the present disclosure, when it is determined that there is a likelihood of occurrence of an abnormality in the supercharger, the maximum rotation speed of the engine and the maximum rotation speed of the rotary machine are changed to a lower rotation speed side and the operating points of the engine and the rotary machine are controlled such that the rotation speed of the engine and the rotation speed of the rotary machine are each within the ranges which do not exceed the changed maximum rotation speeds. Accordingly, even when the supercharger does not operate normally and an abnormal increase in the supercharging pressure occurs, it is possible to curb a high-rotation state of the rotation speed of the engine and the rotation speed of the rotary machine. As a result, even when an abnormal increase in the supercharging pressure occurs, it is possible to curb a decrease in durability of components due to a high-rotation state of the rotation speed of the engine or the rotation speed of the rotary machine.

According to the second aspect of the present disclosure, the amount of change for changing the maximum rotation speed of the engine and the maximum rotation speed of the rotary machine to the lower rotation speed side increases as the likelihood of occurrence of an abnormality in the supercharger increases. Accordingly, it is possible to curb excessive limitation of control ranges of the operating points of the engine and the rotary machine when the likelihood of occurrence of an abnormality in the supercharger is relatively low, and to appropriately prevent the rotation speed of the engine and the rotation speed of the rotary machine from reaching a high-rotation state in spite of occurrence of an abnormal increase in the supercharging pressure when the likelihood of occurrence of an abnormality in the supercharger is relatively high.

According to the third aspect of the present disclosure, since fuel-cut control is performed when it is determined that an abnormality has occurred in the supercharger, it is possible to prevent the rotation speed of the engine and the rotation speed of the rotary machine from reaching a high-rotation state when an abnormality has occurred in the supercharger.

According to the fourth aspect of the present disclosure, since rotary machine torque decrease control is additionally performed when it is determined that an abnormality has occurred in the supercharger, it is possible to appropriately prevent the rotation speed of the rotary machine from reaching a high-rotation state when an abnormality has occurred in the supercharger.

According to the fifth aspect of the present disclosure, since it is determined whether an abnormality has occurred in the supercharger based on at least one of the rate of change of the supercharging pressure from the supercharger and the supercharging pressure difference between the supercharging pressure and the target value of the supercharging pressure, it is possible to determine occurrence of an abnormality in the supercharger such as an abnormal increase in the supercharging pressure due to abnormal operation of the supercharger.

According to the sixth aspect of the present disclosure, it is determined that an abnormality has occurred in the supercharger when both the first abnormality in which the rate of change of the supercharging pressure exceeds a predetermined rate of change and the second abnormality in which the supercharging pressure difference exceeds a predetermined supercharging pressure difference have occurred and it is determined that there is a likelihood of occurrence of an abnormality in the supercharger when only one of the first abnormality and the second abnormality has occurred. Accordingly, it is possible to appropriately determine occurrence of an abnormality in the supercharger such as an abnormal increase in the supercharging pressure due to abnormal operation of the supercharger.

According to the seventh aspect of the present disclosure, the operating point of at least one of the engine and the rotary machine is changed by performing at least one of engine torque decrease control, rotary machine torque decrease control, and gear shifting control. Accordingly, when at least one of the rotation speed of the engine and the rotation speed of the rotary machine exceeds the corresponding maximum rotation speed due to change of the maximum rotation speed to a lower rotation speed side, it is possible to appropriately control the operating points of the engine and the rotary machine such that the rotation speed of the engine and the rotation speed of the rotary machine are within the ranges which do not exceed the corresponding maximum rotation speeds.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 10 is a diagram schematically illustrating a configuration of a vehicle to which the present disclosure is applied and which is different from the vehicle illustrated in FIG. 1;

FIG. 11 is an operation table illustrating a relationship between combinations of a gear shifting operation of a mechanical stepped gear shifting unit illustrated in FIG. 10 and operations of engagement devices which are used therein;

DETAILED DESCRIPTION OF EMBODIMENTS

Hereinafter, embodiments of the present disclosure will be described in detail with reference to the accompanying drawings.

Figure 1:
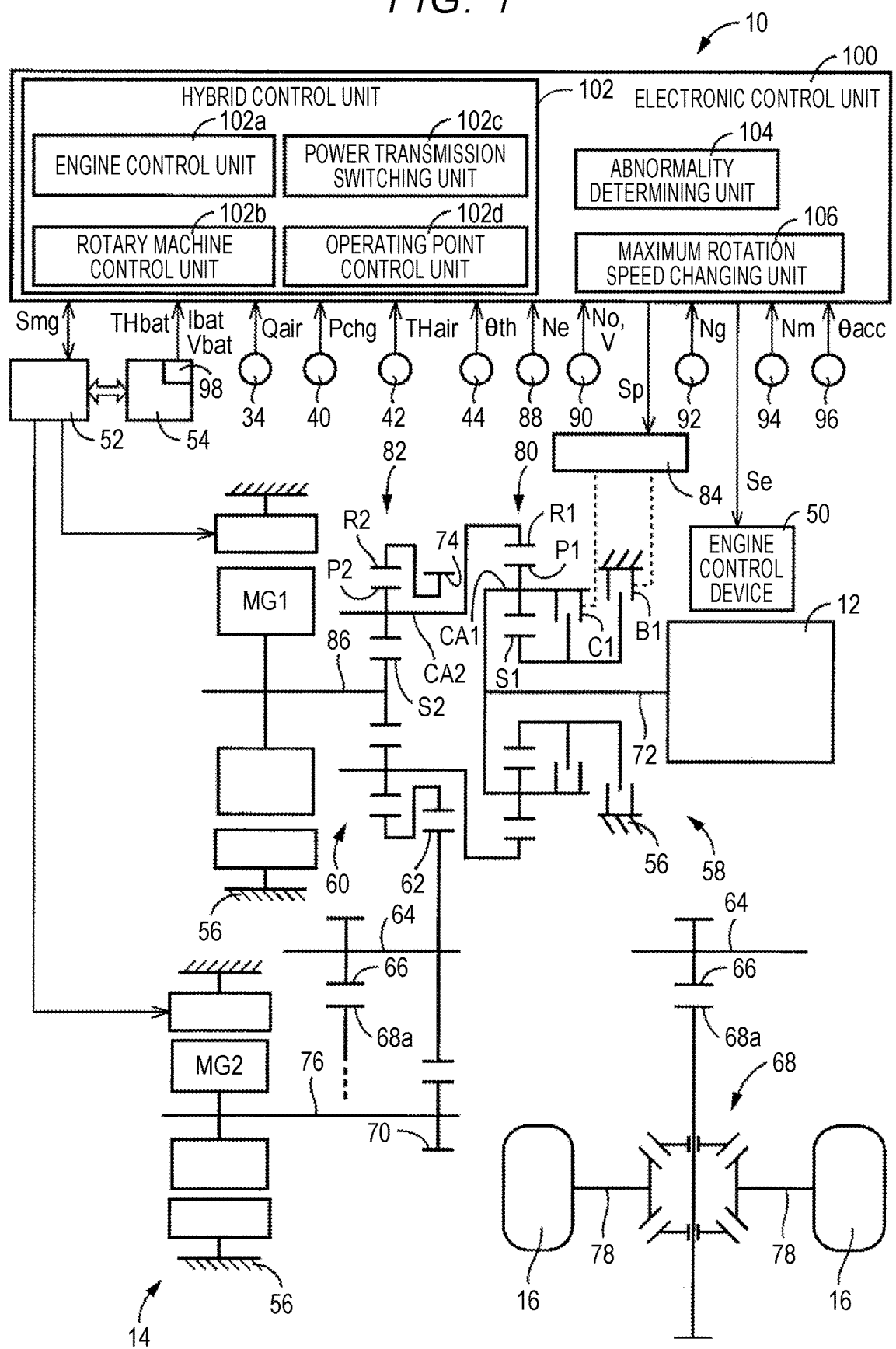
FIG. 1 is a diagram schematically illustrating a configuration of a vehicle to which the present disclosure is applied and illustrating principal parts of a control function and a control system for various types of control in the vehicle.

FIG. 1 is a diagram schematically illustrating a configuration of a vehicle 10 to which the present disclosure is applied and illustrating principal parts of a control function and a control system for various types of control in the vehicle 10. In FIG. 1, the vehicle 10 is a hybrid vehicle including an engine 12, a first rotary machine MG1, a second rotary machine MG2, a power transmission device 14, and driving wheels 16.

Figure 2:
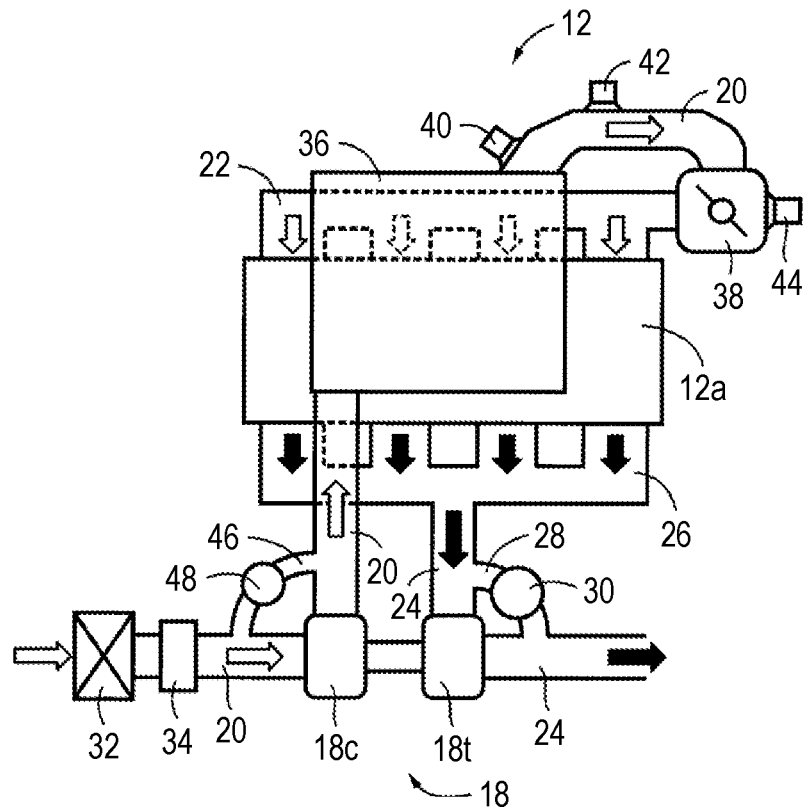
FIG. 2 is a diagram schematically illustrating a configuration of an engine.

FIG. 2 is a diagram schematically illustrating a configuration of the engine 12. In FIG. 2, the engine 12 is a power source for travel of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust-turbine supercharger, that is, a turbocharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t and is rotationally driven by the turbine 18t to compress air suctioned to the engine 12, that is, intake air.

An exhaust bypass 28 that causes exhaust gas to flow from upstream to downstream with respect to the turbine 18t by bypassing the turbine 18t is provided in parallel in the exhaust pipe 24. A waste gate valve (=WGV) 30 that continuously controls a ratio of exhaust gas passing through the exhaust bypass 28 to exhaust gas passing through the turbine 18t is provided in the exhaust bypass 28. A valve opening of the waste gate valve 30 is continuously adjusted by causing an electronic control unit 100 which will be described later to operate an actuator which is not illustrated. As the valve opening of the waste gate valve 30 increases, exhaust gas of the engine 12 is more likely to be discharged via the exhaust bypass 28. Accordingly, in a supercharged state of the engine 12 in which a supercharging operation of the supercharger 18 is effective, a supercharging pressure Pchg from the supercharger 18 decreases as the valve opening of the waste gate valve 30 increases. The supercharging pressure Pchg from the supercharger 18 is a pressure of intake air and is an air pressure downstream from the compressor 18c in the intake pipe 20. A side in which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18.

An air cleaner 32 is provided in an inlet of the intake pipe 20, and an air flowmeter 34 that measures an amount of intake air Qair of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing the electronic control unit 100 which will be described later to operate a throttle actuator which is not illustrated is provided in the intake pipe 20 downstream from the intercooler 36 and upstream from the intake manifold 22. A supercharging pressure sensor 40 that detects the supercharging pressure Pchg from the supercharger 18 and an intake air temperature sensor 42 that detects an intake air temperature THair which is the temperature of intake air are provided in the intake pipe 20 between the intercooler 36 and the electronic throttle valve 38. A throttle valve opening sensor 44 that detects a throttle valve opening θth which is an opening of the electronic throttle valve 38 is provided in the vicinity of the electronic throttle valve 38, for example, in the throttle actuator.

An air recirculation bypass 46 that causes air to recirculate from downstream to upstream with respect to the compressor 18c by bypassing the compressor 18c is provided in parallel in the intake pipe 20. For example, an air bypass valve (=ABV) 48 that is opened at the time of sudden closing of the electronic throttle valve 38 to curb occurrence of a surge and to protect the compressor 18c is provided in the air recirculation bypass 46.

In the engine 12, an engine torque Te which is an output torque of the engine 12 is controlled by causing the electronic control unit 100 which will be described later to control an engine control device 50 (see FIG. 1) including the electronic throttle valve 38, a fuel injection device, an ignition device, and the waste gate valve 30.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as a power source for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 100 which will be described later to control the inverter 52. For example, in the case of forward rotation, an output torque of a rotary machine is a powering torque at a positive torque which is an acceleration side and is a regenerative torque at a negative torque which is a deceleration side. The battery 54 is a power storage device that transmits and receives electric power to and from the first rotary machine MG1 and the second rotary machine MG2. The first rotary machine MG1 and the second rotary machine MG2 are provided in a case 56 which is a non-rotary member attached to the vehicle body.

The power transmission device 14 includes a gear shifting unit 58, a differential unit 60, a driven gear 62, a driven shaft 64, a final gear 66, a differential gear 68, and a reduction gear 70 in the case 56. The gear shifting unit 58 and the differential unit 60 are arranged coaxially with an input shaft 72 which is an input rotary member of the gear shifting unit 58. The gear shifting unit 58 is connected to the engine 12 via the input shaft 72 or the like. The differential unit 60 is connected in series to the gear shifting unit 58. The driven gear 62 engages with a drive gear 74 which is an output rotary member of the differential unit 60. The driven shaft 64 fixes the driven gear 62 and the final gear 66 such that they cannot rotate relative to each other. The final gear 66 has a smaller diameter than the driven gear 62. The differential gear 68 engages with the final gear 66 via a differential ring gear 68a. The reduction gear 70 has a smaller diameter than the driven gear 62 and engages with the driven gear 62. A rotor shaft 76 of the second rotary machine MG2 which is disposed in parallel to the input shaft 72 is connected to the reduction gear 70 separately from the input shaft 72 and is connected to the second rotary machine MG2 in a power-transmittable manner. The power transmission device 14 includes an axle 78 that is connected to the differential gear 68.

The power transmission device 14 having this configuration is suitably used for a vehicle of a front-engine front-drive (FF) type or a rear-engine rear-drive (RR) type. In the power transmission device 14, power which is output from the engine 12, the first rotary machine MG1, and the second rotary machine MG2 is transmitted to the driven gear 62 and is transmitted from the driven gear 62 to the driving wheels 16 sequentially via the final gear 66, the differential gear 68, the axle 78, and the like. In this way, the second rotary machine MG2 is a rotary machine that is connected to the driving wheels 16 in a power-transmittable manner. In the power transmission device 14, the engine 12, the gear shifting unit 58, the differential unit 60, and the first rotary machine MG1, and the second rotary machine MG2 are arranged on different axes, whereby a shaft length is decreased. A reduction gear ratio of the second rotary machine MG2 can be set to be great. Power is synonymous with torque or force when not particularly distinguished.

The gear shifting unit 58 includes a first planetary gear mechanism 80, a clutch C1, and a brake B1. The differential unit 60 includes a second planetary gear mechanism 82. The first planetary gear mechanism 80 is a known single-pinion type planetary gear device including a first sun gear S1, a first pinion P1, a first carrier CA1 that supports the first pinion P1 such that it can rotate and revolve, and a first ring gear R1 that engages with the first sun gear S1 via the first pinion P1. The second planetary gear mechanism 82 is a known single-pinion type planetary gear device including a second sun gear S2, a second pinion P2, a second carrier CA2 that supports the second pinion P2 such that it can rotate and revolve, and a second ring gear R2 that engages with the second sun gear S2 via the second pinion P2.

In the first planetary gear mechanism 80, the first carrier CA1 is a rotary element that is integrally connected to the input shaft 72 and connected to the engine 12 via the input shaft 72 in a power-transmittable manner. The first sun gear S1 is a rotary element that is selectively connected to the case 56 via the brake B1. The first ring gear R1 is a rotary element that is connected to the second carrier CA2 of the second planetary gear mechanism 82 which is an input rotary member of the differential unit 60 and serves as an output rotary member of the gear shifting unit 58. The first carrier CA1 and the first sun gear S1 are selectively connected to each other via the clutch C1.

The clutch C1 and the brake B1 are wet frictional engagement devices and are multi-disc hydraulic frictional engagement devices of which engagement is controlled by a hydraulic actuator. In the clutch C1 and the brake B1, operating states such as an engaged state and a disengaged state are switched based on regulated hydraulic pressures Pc1 and Pb1 which are output from a hydraulic pressure control circuit 84 provided in the vehicle 10 by causing the electronic control unit 100 which will be described later to control the hydraulic pressure control circuit 84.

In a state in which both the clutch C1 and the brake B1 are disengaged, a differential motion of the first planetary gear mechanism 80 is permitted. Accordingly, in this state, since a reaction torque of the engine torque Te is not taken in the first sun gear S1, the gear shifting unit 58 is in a neutral state in which mechanical power transmission is not possible, that is, a neutral state. In a state in which the clutch C1 is engaged and the brake B1 is disengaged, the rotary elements of the first planetary gear mechanism 80 rotate integrally. Accordingly, in this state, rotation of the engine 12 is transmitted from the first ring gear R1 to the second carrier CA2 at a constant speed. On the other hand, in a state in which the clutch C1 is disengaged and the brake B1 is engaged, rotation of the first sun gear S1 of the first planetary gear mechanism 80 is prohibited and rotation of the first ring gear R1 is increased to be higher than rotation of the first carrier CA1. Accordingly, in this state, rotation of the engine 12 is increased and output from the first ring gear R1. In this way, the gear shifting unit 58 serves as a two-stage stepped transmission which is switched, for example, between a low gear stage in a directly coupled state with a gear ratio of "1.0" and a high gear stage in an overdrive state with a gear ratio of "0.7." In a state in which both the clutch C1 and the brake B1 are engaged, rotation of the rotary elements of the first planetary gear mechanism 80 is prohibited. Accordingly, in this state, rotation of the first ring gear R1 which is the output rotary member of the gear shifting unit 58 is stopped and thus rotation of the second carrier CA2 which is the input rotary member of the differential unit 60 is stopped.

In the second planetary gear mechanism 82, the second carrier CA2 is a rotary element that is connected to the first ring gear R1 which is the output rotary member of the gear shifting unit 58 and serves as an input rotary member of the differential unit 60. The second sun gear S2 is a rotary element that is integrally connected to the rotor shaft 86 of the first rotary machine MG1 and is connected to the first rotary machine MG1 in a power-transmittable manner. The second ring gear R2 is a rotary element that is integrally connected to the drive gear 74 and is connected to the driving wheels 16 in a power-transmittable manner and serves as an output rotary member of the differential unit 60. The second planetary gear mechanism 82 is a power split mechanism that mechanically splits power of the engine 12 which is input to the second carrier CA2 via the gear shifting unit 58 to the first rotary machine MG1 and the drive gear 74. That is, the second planetary gear mechanism 82 is a differential mechanism that splits and transmits power of the engine 12 to the driving wheels 16 and the first rotary machine MG1. In the second planetary gear mechanism 82, the second carrier CA2 serves as an input element, the second sun gear S2 serves as a reaction element, and the second ring gear R2 serves as an output element. The differential unit 60 constitutes an electrical gear shifting mechanism, for example, an electrical stepless transmission, in which a differential state of the second planetary gear mechanism 82 is controlled by controlling the operating state of the first rotary machine MG1 along with the first rotary machine MG1 that is connected to the second planetary gear mechanism 82 in a power-transmittable manner. The first rotary machine MG1 is a rotary machine to which power of the engine 12 is transmitted. Since the gear shifting unit 58 is in overdrive, an increase in torque of the first rotary machine MG1 is curbed. Controlling the operating state of the first rotary machine MG1 refers to performing operation control of the first rotary machine MG1.

Figure 3:
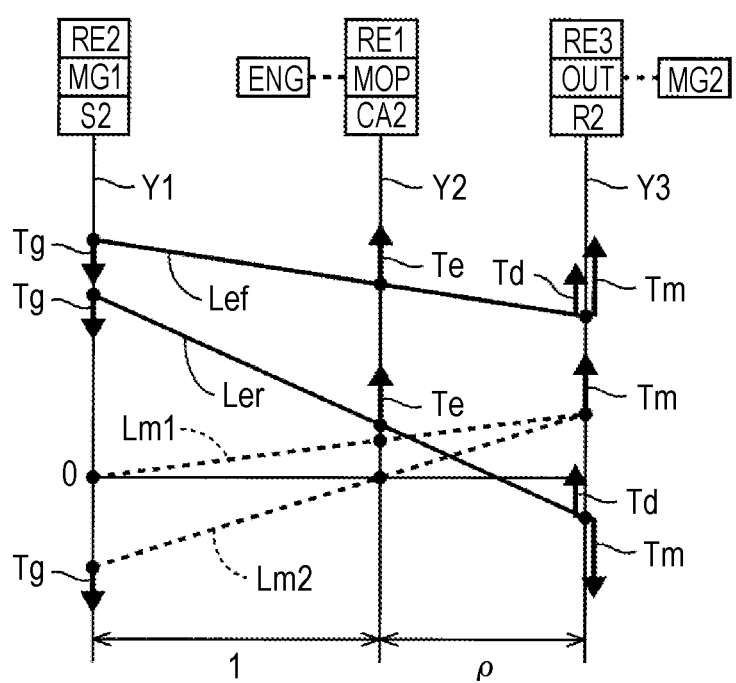
FIG. 3 is a collinear diagram relatively illustrating rotation speeds of rotary elements in a differential unit.

FIG. 3 is a collinear diagram illustrating rotation speeds of the rotary elements in the differential unit 60 relative to each other. In FIG. 3, three vertical lines Y1, Y2, and Y3 correspond to three rotary elements of the second planetary gear mechanism 82 constituting the differential unit 60. The vertical line Y1 represents the rotation speed of the second sun gear S2 which is a second rotary element RE2 connected to the first rotary machine MG1 (see "MG1" in the drawing). The vertical line Y2 represents the rotation speed of the second carrier CA2 which is a first rotary element RE1 connected to the engine 12 (see "ENG" in the drawing) via the gear shifting unit 58. The vertical line Y3 represents the rotation speed of the second ring gear R2 which is a third rotary element RE3 integrally connected to the drive gear 74 (see "OUT" in the drawing). The second rotary machine MG2 (see "MG2" in the drawing) is connected to the driven gear 62 engaging with the drive gear 74 via the reduction gear 70 or the like. A mechanical oil pump (see "MOP" in the drawing) which is provided in the vehicle 10 is connected to the second carrier CA2. This mechanical oil pump is operated with rotation of the second carrier CA2 to supply oil which is used for engaging operations of the clutch C1 and the brake B1, lubrication of the parts, and cooling of the parts. When rotation of the second carrier CA2 is stopped, the oil is supplied by an electrical oil pump (not illustrated) which is provided in the vehicle 10. The gaps between the vertical lines Y1, Y2, and Y3 are determined according to a gear ratio ρ (=number of teeth of the sun gear/number of teeth of the ring gear) of the second planetary gear mechanism 82. In the relationship between the vertical axes in the collinear diagram, when the gap between a sun gear and a carrier corresponds to "1," the gap between the carrier and a ring gear corresponds to the gear ratio ρ.

A solid line Lef in FIG. 3 denotes an example of relative speeds of the rotary elements at the time of forward travel in a hybrid travel (=HV travel) mode in which hybrid travel using at least the engine 12 as a power source is possible. A solid line Ler in FIG. 3 denotes an example of relative speeds of the rotary elements at the time of reverse travel in the HV travel mode. In the HV travel mode, in the second planetary gear mechanism 82, for example, when an MG1 torque Tg which is a reaction torque and a negative torque of the first rotary machine MG1 with respect to an engine torque Te which is input to the second carrier CA2 via the gear shifting unit 58 is input to the second sun gear S2, a direct engine-transmitted torque Td which is a positive torque appears in the second ring gear R2. For example, when the MG1 torque Tg $(=-\rho/(1+\rho)\times Te)$ which is a reaction torque with respect to the engine torque Te that is a positive torque which is input to the second carrier CA2 is input to the second sun gear S2 in a state in which the clutch C1 is engaged, the brake B1 is disengaged, and the gear shifting unit 58 is in a directly coupled state with a gear ratio of "1.0," a direct engine-transmitted torque Td $(=Te/(1+\rho) =-(1/\rho)\times Tg)$ appears in the second ring gear R2. A combined torque of the direct engine-transmitted torque Td and the MG2 torque Tm which are transmitted to the driven gear 62 can be transmitted as a drive torque of the vehicle 10 to the driving wheels 16 according to a required driving force. The first rotary machine MG1 serves as a power generator when a negative torque is generated at the time of positive rotation. A generated electric power Wg of the first rotary machine MG1 charges the battery 54 or is consumed in the second rotary machine MG2. The second rotary machine MG2 outputs the MG2 torque Tm using all or some of the generated electric power Wg or electric power from the battery 54 in addition to the generated electric power Wg. The MG2 torque Tm at the time of forward travel is a powering torque which is a positive torque at the time of forward rotation, and the MG2 torque Tm at the time of reverse travel is a powering torque which is a negative torque at the time of reverse rotation.

The differential unit 60 can operate as an electrical stepless transmission. For example, in the HV travel mode, when the rotation speed of the first rotary machine MG1, that is, the rotation speed of the second sun gear S2, increases or decreases with respect to an output rotation speed No which is the rotation speed of the drive gear 74 which is constrained on rotation of the driving wheels 16 by controlling the operating state of the first rotary machine MG1, the rotation speed of the second carrier CA2 increases or decreases. Since the second carrier CA2 is connected to the engine 12 via the gear shifting unit 58, an engine rotation speed Ne which is the rotation speed of the engine 12 increases or decreases with the increase or decrease in the rotation speed of the second carrier CA2. Accordingly, in the HV travel, it is possible to perform control such that an engine operating point OPeng is set to an efficient operating point. This hybrid type is referred to as a mechanical split type or a split type. The first rotary machine MG1 is a rotary machine that can control the engine rotation speed Ne, that is, a rotary machine that can adjust the engine rotation speed Ne. An operating point is an operation point which is expressed by a rotation speed and a torque, and the engine operating point OPeng is an operation point of the engine 12 which is expressed by the engine rotation speed Ne and the engine torque Te.

A dotted line Lm1 in FIG. 3 represents an example of relative speeds of the rotary elements at the time of forward travel in a single-motor-driven EV mode in which motor-driven travel using only the second rotary machine MG2 as a power source is possible in a motor-driven travel (=EV travel) mode. A dotted line Lm2 in FIG. 3 represents an example of relative speeds of the rotary elements at the time of forward travel in a double-motor-driven EV mode in which motor-driven travel using both the first rotary machine MG1 and the second rotary machine MG2 as a power source is possible in the EV travel mode. The EV travel mode is a travel mode in which motor-driven travel using at least one of the first rotary machine MG1 and the second rotary machine MG2 as a power source in a state in which operation of the engine 12 is stopped is possible.

In the single-motor-driven EV mode, when both the clutch C1 and the brake B1 are disengaged and the gear shifting unit 58 falls into a neutral state, the differential unit 60 also falls into a neutral state. In this state, the MG2 torque Tm can be transmitted as a drive torque of the vehicle 10 to the driving wheels 16. In the single-motor-driven EV mode, for example, the first rotary machine MG1 is maintained at zero rotation in order to reduce a drag loss in the first rotary machine MG1. For example, even when control is performed such that the first rotary machine MG1 is maintained at zero rotation, the differential unit 60 is in the neutral state and thus the drive torque is not affected.

In the double-motor-driven EV mode, when both the clutch C1 and the brake B1 are engaged and rotation of the rotary elements of the first planetary gear mechanism 80 is prohibited, the second carrier CA2 is stopped at zero rotation. In this state, the MG1 torque Tg and the MG2 torque Tm can be transmitted as the drive torque of the vehicle 10 to the driving wheels 16.

Referring back to FIG. 1, the vehicle 10 further includes an electronic control unit 100 serving as a controller including the control device for the vehicle 10 associated with control of the engine 12, the first rotary machine MG1, the second rotary machine MG2, and the like. For example, the electronic control unit 100 is configured to include a so-called microcomputer including a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity.

The electronic control unit 100 is supplied with various signals (for example, an intake air amount Qair, a supercharging pressure Pchg, an intake air temperature THair, a throttle valve opening θth, an engine rotation speed Ne, an output rotation speed No corresponding to a vehicle speed V, an MG1 rotation speed Ng which is the rotation speed of the first rotary machine MG1, an MG2 rotation speed Nm which is the rotation speed of the second rotary machine MG2, an accelerator opening θacc which is an accelerator operation amount by a driver indicating the magnitude of the driver's acceleration operation, a battery temperature THbat which is a temperature of the battery 54, a battery charging/discharging current Ibat, and a battery voltage Vbat) based on detection values from various sensors (for example, an air flowmeter 34, a supercharging pressure sensor 40, an intake air temperature sensor 42, a throttle valve opening sensor 44, an engine rotation speed sensor 88, an output rotation speed sensor 90, an MG1 rotation speed sensor 92, an MG2 rotation speed sensor 94, an accelerator opening sensor 96, and a battery sensor 98) which are provided in the vehicle 10. The electronic control unit 100 outputs various command signals (for example, an engine control command signal Se for controlling the engine 12, a rotary machine control command signal Smg for controlling the first rotary machine MG1 and the second rotary machine MG2, and a hydraulic pressure control command signal Sp for controlling the operating states of the clutch C1 and the brake B1) to various devices (for example, the engine control device 50, the inverter 52, and the hydraulic pressure control circuit 84) which are provided in the vehicle 10.

The electronic control unit 100 calculates a state of charge (SOC) value SOC [%] which is a value indicating the state of charge of the battery 54, for example, based on the battery charging/discharging current Ibat and the battery voltage Vbat. The electronic control unit 100 calculates chargeable and dischargeable powers Win and Wout for defining a feasible range of a battery power Pbat which is the power of the battery 54, for example, based on the battery temperature THbat and the SOC value SOC of the battery 54. The chargeable and dischargeable powers Win and Wout include a chargeable power Win which is a possible input power for defining limitation of an input power of the battery 54 and a dischargeable power Wout which is a possible output power for defining limitation of an output power of the battery 54. For example, the chargeable and dischargeable powers Win and Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in the normal area. For example, the chargeable power Win decreases as the SOC value SOC increases in an area in which the SOC value SOC is high. For example, the dischargeable power Wout decreases as the SOC value SOC decreases in an area in which the SOC value SOC is low.

The electronic control unit 100 includes a hybrid control means, that is, a hybrid control unit 102, that realizes various types of control in the vehicle 10.

The hybrid control unit 102 has a function of an engine control means, that is, an engine control unit 102a, that controls the operation of the engine 12, a function of a rotary machine control means, that is, a rotary machine control unit 102b, that controls the operations of the first rotary machine MG1 and the second rotary machine MG2 via the inverter 52, and a function of a power transmission switching means, that is, a power transmission switching unit 102c, that switches a power transmission state in the gear shifting unit 58, and performs hybrid drive control or the like using the engine 12, the first rotary machine MG1, and the second rotary machine MG2 based on such control functions.

The hybrid control unit 102 calculates a required drive torque Twdem which is a drive torque Tw required for the vehicle 10, for example, by applying the accelerator opening θacc and the vehicle speed V to a driving force map which is a relationship which is acquired and stored in advance by experiment or design, that is, a predetermined relationship. In other words, the required drive torque Twdem is a required drive power Pwdem at the vehicle speed V at that time. Here, the output rotation speed No or the like may be used instead of the vehicle speed V. As the driving force map, for example, a map for forward travel and a map for reverse travel are separately set.

The hybrid control unit 102 outputs an engine control command signal Se which is a command signal for controlling the engine 12 and a rotary machine control command signal Smg which is a command signal for controlling the first rotary machine MG1 and the second rotary machine MG2 such that the required drive power Pwdem is realized by at least one power source of the engine 12, the first rotary machine MG1, and the second rotary machine MG2 in consideration of a required charging/discharging power which is a charging/discharging power required for the battery 54 or the like.

For example, when the vehicle travels in the HV travel mode, the engine control command signal Se is a command value of an engine power Pe for outputting a target engine torque Tetgt at a target engine rotation speed Netgt in consideration of the optimal engine operating point OPengf and the like and realizing the required engine power Pedem in consideration of the required charging/discharging power, charging/discharging efficiency in the battery 54, and the like in addition to the required drive power Pwdem. The rotary machine control command signal Smg is a command value of a generated electric power Wg of the first rotary machine MG1 that outputs the MG1 torque Tg at the MG1 rotation speed Ng at the time of outputting a command as a reaction torque for causing the engine rotation speed Ne to reach the target engine rotation speed Netgt and is a command value of power consumption Wm of the second rotary machine MG2 that outputs the MG2 torque Tm at the MG2 rotation speed Nm at the time of outputting a command. For example, the MG1 torque Tg in the HV travel mode is calculated by feedback control in which the first rotary machine MG1 operates such that the engine rotation speed Ne reaches the target engine rotation speed Netgt. For example, the MG2 torque Tm in the HV travel mode is calculated such that the required drive torque Twdem is acquired by addition to a value corresponding to a drive torque Tw based on the engine direct-transmitted torque Td. The optimal engine operating point OPengf is determined in advance, for example, as an engine operating point OPeng at which total fuel efficiency in the vehicle 10 is the best in consideration of charging/discharging efficiency in the battery 54 in addition to the fuel efficiency of only the engine 12 when the required engine power Pedem is realized. The target engine rotation speed Netgt is a target value of the engine rotation speed Ne, that is, a target rotation speed of the engine 12, and the target engine torque Tetgt is a target value of the engine torque Te. The engine power Pe is an output, that is, power, of the engine 12 and the required engine power Pedem is an output required for the engine 12. In this way, the vehicle 10 is a vehicle in which the MG1 torque Tg which is a reaction torque of the first rotary machine MG1 is controlled such that the engine rotation speed Ne reaches the target engine rotation speed Netgt.

Figure 4:
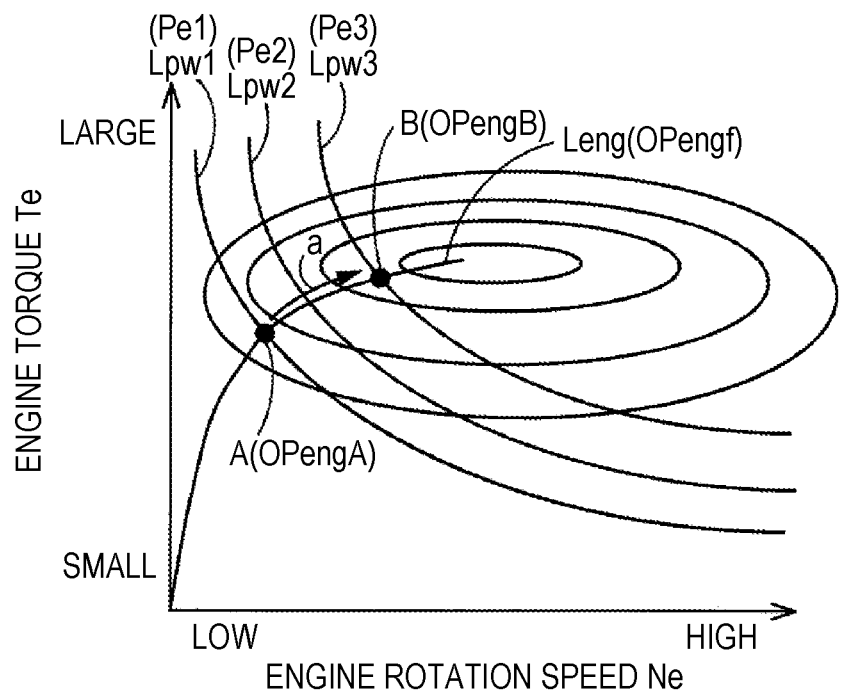
FIG. 4 is a diagram illustrating an example of an optimal engine operating point.

FIG. 4 is a diagram illustrating an example of the optimal engine operating point OPengf on a two-dimensional coordinate system with the engine rotation speed Ne and the engine torque Te as variables. In FIG. 4, a solid line Leng denotes a group of optimal engine operating points OPengf. Equi-power lines Lpw1, Lpw2, and Lpw3 denote examples in which the required engine power Pedem is required engine powers Pe1, Pe2, and Pe3, respectively. A point A is an engine operating point OPengA when the required engine power Pe1 is realized on the optimal engine operating point OPengf, and a point B is an engine operating point OPengB when the required engine power Pe3 is realized on the optimal engine operating point OPengf. The points A and B are also target values of the engine operating point OPeng which is expressed by the target engine rotation speed Netgt and the target engine torque Tetgt, that is, a target engine operating point OPengtgt which is a target operating point. For example, when the target engine operating point OPengtgt changes from the point A to the point B with an increase in the accelerator opening θacc, the engine operating point OPeng is controlled such that it changes on a path passing through the optimal engine operating points OPengf.

The hybrid control unit 102 selectively sets up the EV travel mode or the HV travel mode as the travel mode according to the travel conditions and causes the vehicle 10 to travel in the corresponding travel mode. For example, the hybrid control unit 102 sets up the EV travel mode in a motor-driven travel area in which the required drive power Pwdem is less than a predetermined threshold value, and sets up the HV travel mode in a hybrid travel area in which the required drive power Pwdem is equal to or greater than the predetermined threshold value. Even when the required drive power Pwdem is in the motor-driven travel area, the hybrid control unit 102 sets up the HV travel mode when the SOC value SOC of the battery 54 is less than a predetermined engine start threshold value or when warming-up of the engine 12 is necessary. The engine start threshold value is a predetermined threshold value for determining whether the SOC value SOC indicates that the battery 54 needs to be charged by forcibly starting the engine 12.

Figure 5:
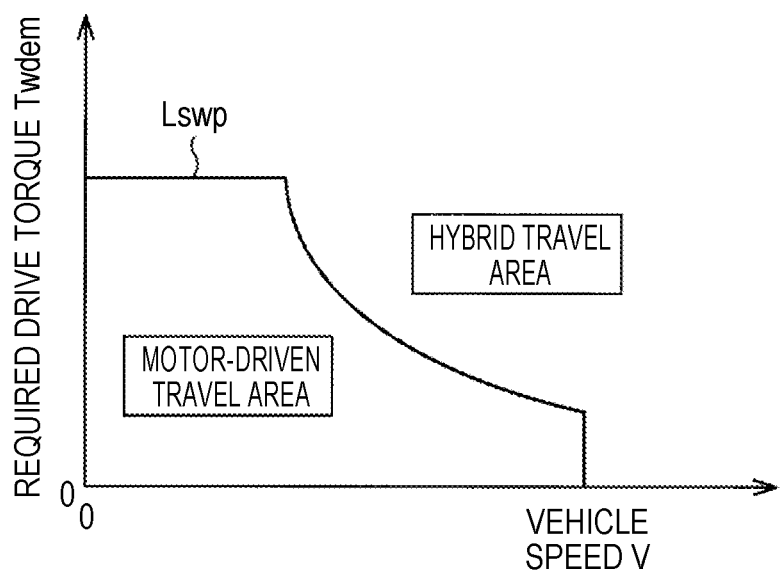
FIG. 5 is a diagram illustrating an example of a power source switching map which is used for switching control between motor-driven travel and hybrid travel.

FIG. 5 is a diagram illustrating an example of a power source switching map which is used for switching control between motor-driven travel and hybrid travel. In FIG. 5, a solid line Lswp is a boundary line between the motor-driven travel area and the hybrid travel area at which switching between the motor-driven travel and the hybrid travel is performed. An area in which the vehicle speed V is relatively low, the required drive torque Twdem is relatively small, and the required drive power Pwdem is relatively small is defined in advance in the motor-driven travel area. An area in which the vehicle speed V is relatively high or the required drive torque Twdem is relatively great and the required drive power Pwdem is relatively great is defined in advance in the hybrid travel area. When the SOC value SOC of the battery 54 is less than the engine-start threshold value or when warming-up of the engine 12 is necessary, the motor-driven travel area in FIG. 5 may be changed to the hybrid travel area.

When the EV travel mode is set up and the required drive power Pwdem can be realized by only the second rotary machine MG2, the hybrid control unit 102 sets up a single-motor-driven EV mode. On the other hand, when the EV travel mode is set up and the required drive power Pwdem cannot be realized by only the second rotary machine MG2, the hybrid control unit 102 sets up a double-motor-driven EV mode. Although the required drive power Pwdem can be realized by only the second rotary machine MG2, the hybrid control unit 102 may set up the double-motor-driven EV mode when use of both the first rotary machine MG1 and the second rotary machine MG2 is more efficient than use of only the second rotary machine MG2.

The hybrid control unit 102 controls engagements of the clutch C1 and the brake B1 based on the set-up travel mode. The hybrid control unit 102 outputs a hydraulic pressure control command signal Sp for engaging and/or disengaging the clutch C1 and the brake B1 to the hydraulic pressure control circuit 84 such that transmission of power for travel in the set-up travel mode becomes possible.

Figures 6, 7:
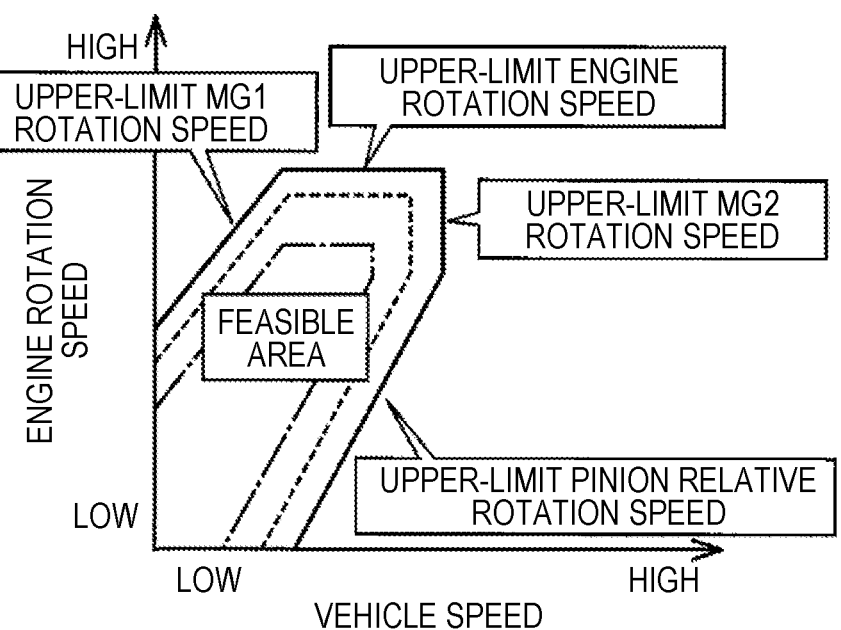
FIG. 6 is a table illustrating operating states of a clutch and a brake in each travel mode.
FIG. 7 is a diagram illustrating an example of a feasible area of an engine rotation speed.

FIG. 6 is a table illustrating operating states of the clutch C1 and the brake B1 in the travel modes. In FIG. 6, mark O denotes engagement of the clutch C1 and the brake B1, a blank denotes disengagement, and mark Δ denotes that one thereof is engaged at the time of additional use of an engine brake for switching the engine 12 in a rotation-stopped state to a corotating state. "G" denotes that the first rotary machine MG1 serves mainly as a generator, and "M" denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as a travel mode. The EV travel mode has two modes including the single-motor-driven EV mode and the double-motor-driven EV mode.

The single-motor-driven EV mode is realized in a state in which both the clutch C1 and the brake B1 are disengaged. In the single-motor-driven EV mode, the clutch C1 and the brake B1 are disengaged and thus the gear shifting unit 58 falls into a neutral state. When the gear shifting unit 58 falls into the neutral state, the differential unit 60 falls into a neutral state in which a reaction torque of the MG1 torque Tg is not taken in the second carrier CA2 connected to the first ring gear R1. In this state, the hybrid control unit 102 causes the second rotary machine MG2 to output the MG2 torque Tm for travel (see a dotted line Lm1 in FIG. 3). In the single-motor-driven EV mode, reverse travel may be performed by rotating the second rotary machine MG2 oppositely to the rotating direction at the time of forward travel.

In the single-motor-driven EV mode, since the first ring gear R1 is corotated with the second carrier CA2 but the gear shifting unit 58 is in the neutral state, the engine 12 is not corotated but is stopped with zero rotation. Accordingly, when regeneration control is performed in the second rotary machine MG2 during travel in the single-motor-driven EV mode, it is possible to take a large amount of regeneration. When the battery 54 is fully charged and regenerative energy is not taken during travel in the single-motor-driven EV mode, additional use of the engine brake can be considered. When the engine brake is used together, the brake B1 or the clutch C1 is engaged (see "USE IN COMBINATION WITH ENGINE BRAKE" in FIG. 6). When the brake B1 or the clutch C1 is engaged, the engine 12 is corotated and the engine brake operates.

The double-motor-driven EV mode is realized in a state in which both the clutch C1 and the brake B1 are engaged. In the double-motor-driven EV mode, since the clutch C1 and the brake B1 are engaged, rotation of the rotary elements of the first planetary gear mechanism 80 is stopped, the engine 12 is stopped with zero rotation, and rotation of the second carrier CA2 connected to the first ring gear R1 is stopped. When rotation of the second carrier CA2 is stopped, a reaction torque of the MG1 torque Tg is taken in the second carrier CA2, and thus the MG1 torque Tg can be mechanically output from the second ring gear R2 and be transmitted to the driving wheels 16. In this state, the hybrid control unit 102 causes the first rotary machine MG1 and the second rotary machine MG2 to output the MG1 torque Tg and the MG2 torque Tm for travel (see the dotted line Lm2 in FIG. 3). In the double-motor-driven EV mode, both the first rotary machine MG1 and the second rotary machine MG2 can be rotated oppositely to the rotating direction at the time of forward travel to allow reverse travel.

A low state of the HV travel mode is realized in a state in which the clutch C1 is engaged and the brake B1 is disengaged. In the low state of the HV travel mode, since the clutch C1 is engaged, the rotary elements of the first planetary gear mechanism 80 are integrally rotated and the gear shifting unit 58 falls into a directly coupled state. Accordingly, rotation of the engine 12 is transmitted from the first ring gear R1 to the second carrier CA2 at a constant speed. A high state of the HV travel mode is realized in a state in which the brake B1 is engaged and the clutch C1 is disengaged. In the high state of the HV travel mode, since the brake B1 is engaged, rotation of the first sun gear S1 is stopped and the gear shifting unit 58 falls into an overdrive state. Accordingly, rotation of the engine 12 increases and is transmitted from the first ring gear R1 to the second carrier CA2. In the HV travel mode, the hybrid control unit 102 causes the first rotary machine MG1 to output the MG1 torque Tg which is a reaction torque of the engine torque Te by power generation and causes the second rotary machine MG2 to output the MG2 torque Tm by the generated electric power Wg of the first rotary machine MG1 (see a solid line Lef in FIG. 3). In the HV travel mode, for example, in the low state of the HV travel mode, the second rotary machine MG2 can also be rotated oppositely to the rotating direction at the time of forward travel to allow reverse travel (see a solid line Ler in FIG. 3). In the HV travel mode, the vehicle can travel additionally using the MG2 torque Tm based on electric power from the battery 54. In the HV travel mode, for example, when the vehicle speed V is relatively high and the required drive torque Twdem is relatively small, the high state of the HV travel mode is set up.

Here, the hybrid control unit 102 controls the engine 12 and the first rotary machine MG1 such that the engine rotation speed Ne does not exceed an upper-limit engine rotation speed Nelim and the MG1 rotation speed Ng does not exceed an upper-limit MG1 rotation speed Nglim. The upper-limit engine rotation speed Nelim is, for example, a predetermined upper-limit rotation speed for making it difficult to decrease the performance of the engine 12, which is defined as a predetermined rating of the engine 12. The upper-limit MG1 rotation speed Nglim is, for example, a predetermined upper-limit rotation speed for curbing a decrease in performance of the first rotary machine MG1, which is defined with a predetermined rating of the first rotary machine MG1. Since the engine rotation speed Ne or the MG1 rotation speed Ng is associated with each other as can be clearly understood from the collinear diagram illustrated in FIG. 3, the MG1 rotation speed Ng can be made not to exceed the upper-limit MG1 rotation speed Nglim in addition to the engine rotation speed Ne, for example, by defining a feasible area of the engine rotation speed Ne.

FIG. 7 is a diagram illustrating an example of a feasible area of the engine rotation speed Ne on a two-dimensional coordinate system with the vehicle speed V and the engine rotation speed Ne as variables. In FIG. 7, when the engine rotation speed Ne increases in a low area of the vehicle speed V, that is, the output rotation speed No, the MG1 rotation speed Ng exceeds the upper-limit MG1 rotation speed Nglim before the engine rotation speed Ne exceeds the upper-limit engine rotation speed Nelim, and thus a feasible area of the engine rotation speed Ne is defined according to the upper-limit MG1 rotation speed Nglim. As the vehicle speed V increases, the feasible area of the engine rotation speed Ne which is defined according to the upper-limit MG1 rotation speed Nglim is enlarged to a high-rotation side of the engine rotation speed Ne. However, since a predetermined upper-limit rotation speed is defined in the engine 12, the feasible area of the engine rotation speed Ne is defined according to the upper-limit engine rotation speed Nelim in a middle vehicle-speed area. On the other hand, when the output rotation speed No increases in the low area of the engine rotation speed Ne, a relative rotation speed of the second pinion P2 which is the absolute value of a rotation speed difference between an autorotation speed of the second pinion P2 and the rotation speed of the second carrier CA2 corresponding to the engine rotation speed Ne, that is, a revolution speed of the second pinion P2 increases and thus the feasible area of the engine rotation speed Ne is defined according to an upper-limit rotation speed of the relative rotation speed of the second pinion P2. The upper-limit rotation speed of the relative rotation speed of the second pinion P2 is, for example, a predetermined upper-limit rotation speed for making it difficult to decrease the performance of the second pinion P2. As the engine rotation speed Ne increases, the feasible area of the engine rotation speed Ne which is defined according to the upper-limit rotation speed of the relative rotation speed of the second pinion P2 is enlarged to a high vehicle-speed side. However, since a predetermined upper-limit rotation speed is defined in the second rotary machine MG2, the feasible area of the engine rotation speed Ne is defined according to an upper-limit MG2 rotation speed Nmlim in a high vehicle-speed area. The upper-limit MG2 rotation speed Nmlim is, for example, a predetermined upper-limit rotation speed for making it difficult to decrease the performance of the second rotary machine MG2, which is defined as a predetermined rating of the second rotary machine MG2.

When the engine rotation speed Ne does not exceed the upper-limit rotation speed in the feasible area of the engine rotation speed Ne as illustrated in FIG. 7, the engine rotation speed Ne cannot exceed the upper-limit engine rotation speed Nelim and the MG1 rotation speed Ng cannot exceed the upper-limit MG1 rotation speed Nglim. In this embodiment, in order for the engine rotation speed Ne not to exceed the upper-limit engine rotation speed Nelim and in order for the MG1 rotation speed Ng not to exceed the upper-limit MG1 rotation speed Nglim, the hybrid control unit 102 more appropriately performs control such that the engine rotation speed Ne is within a range which is not greater than an engine maximum rotation speed Nemax which is the maximum rotation speed Nmax of the engine 12 set lower by a margin α than the upper-limit rotation speed in the feasible area of the engine rotation speed Ne. The margin α is, for example, a margin of the engine rotation speed Ne which is determined in advance such that the engine rotation speed Ne and the MG1 rotation speed Ng do not exceed the predetermined upper-limit rotation speeds thereof. Since the engine 12 is controlled within a range which is not greater than the maximum engine rotation speed Nemax, the first rotary machine MG1 is controlled within a range which is not greater than a maximum MG1 rotation speed Ngmax which is the maximum rotation speed Nmax of the first rotary machine MG1 which is set to be lower by a margin β than the upper-limit MG1 rotation speed Nglim. The margin β is, for example, a margin of the MG1 rotation speed Ng which is determined in advance such that the MG1 rotation speed Ng does not exceed the upper-limit MG1 rotation speed Nglim.

Since the MG2 rotation speed Nm for defining a feasible area in a high vehicle-speed area can be more appropriately prevented from exceeding an upper-limit MG2 rotation speed Nmlim, the hybrid control unit 102 performs control such that the MG2 rotation speed Nm is within a range which does not exceed a maximum MG2 rotation speed Nmmax which is a maximum rotation speed Nmax of the second rotary machine MG2 set lower by a margin γ than the upper-limit rotation speed in the feasible area of the MG2 rotation speed Nm. The margin γ is, for example, a predetermined margin of the MG2 rotation speed Nm for preventing the MG2 rotation speed Nm from exceeding the upper-limit MG2 rotation speed Nmlim. The same is true of the relative rotation speed of the second pinion P2.

The feasible area of the engine 12, the second rotary machine MG2, or the like is defined according to the predetermined upper-limit rotation speed of the engine 12, the second rotary machine MG2, or the like as indicated by a solid line in FIG. 7. More preferably, the feasible area of the engine 12, the second rotary machine MG2, or the like is defined according to the maximum rotation speed Nmax of the engine 12, the second rotary machine MG2, or the like, for example, as indicated by a dotted line in FIG. 7. For example, the feasible area which is surrounded by the dotted line in FIG. 7 is an area in which a high rotation limited area for limiting use of a predetermined upper-limit rotation speed or a high rotation-speed area in the vicinity of the predetermined upper-limit rotation speed is set in the feasible area which is surrounded by the solid line in FIG. 7.

The above-mentioned target engine operating point OPengtgt is set as an engine operating point OPeng for realizing the required engine power Pedem, and is set in consideration of the engine rotation speed Ne being within a range which is not greater than the maximum engine rotation speed Nemax. The hybrid control unit 102 serves as an operating point control means, that is, an operating point control unit 102d, that controls the engine 12 and the first rotary machine MG1 such that the engine operating point OPeng reaches the target engine operating point OPengtgt which is set such that the engine rotation speed Ne is within a range not greater than the maximum engine rotation speed Nemax with a margin (=margin α) of the engine rotation speed Ne from the predetermined upper-limit rotation speeds of the engine 12 and the first rotary machine MG1 and which is set such that the required engine power Pedem is output from the engine 12. Control of the engine 12 is, for example, control of the engine torque Te for outputting the target engine torque Tetgt. Control of the first rotary machine MG1 is, for example, control of the MG1 torque Tg by feedback control for operating the first rotary machine MG1 such that the engine rotation speed Ne reaches the target engine rotation speed Netgt.

The operating point of the second rotary machine MG2 is controlled such that the MG2 rotation speed Nm is within a range which does not exceed the maximum MG2 rotation speed Nmmax. That is, the operating point control unit 102d controls the operating points of the engine 12 and the second rotary machine MG2 such that the engine rotation speed Ne is within a range which does not exceed the maximum engine rotation speed Nemax with a margin (=margin α) of the MG2 rotation speed Nm of the engine rotation speed Ne from the upper-limit engine rotation speed Nelim and the MG2 rotation speed Nm is within a range which does not exceed the maximum MG2 rotation speed Nmmax with a margin (=margin γ) from the upper-limit MG2 rotation speed Nmlim. The high rotation limited area is also an operating point limited area in which the operating points of the engine 12, the second rotary machine MG2, and the like are limited.

The engine 12 includes the supercharger 18. Accordingly, when an abnormal increase in the supercharging pressure Pchg from the supercharger 18 occurs due to abnormal operation of the supercharger 18, there is a likelihood of a high-rotation state in which the engine rotation speed Ne or the MG2 rotation speed Nm reaches a predetermined upper-limit rotation speed even with control of the operating points of the engine 12 and the second rotary machine MG2 as described above. When the engine rotation speed Ne or the MG2 rotation speed Nm is in the high-rotation state, a decrease in durability of various components such as the engine 12, the second rotary machine MG2, the first rotary machine MG1, and the first planetary gear mechanism 80 and the second planetary gear mechanism 82 provided in the power transmission device 14 may be caused.

The electronic control unit 100 further includes an abnormality determining means, that is, an abnormality determining unit 104, and a maximum rotation speed changing means, that is, a maximum rotation speed changing unit 106, in order to realize the control function of curbing a decrease in durability of components due to a high-rotation state of the engine rotation speed Ne or the MG2 rotation speed Nm even when an abnormal increase in the supercharging pressure Pchg occurs.

The abnormality determining unit 104 determines whether an abnormality has occurred in the supercharger 18. An abnormality in the supercharger 18 is, for example, an abnormality of the supercharger 18 in which the supercharging pressure Pchg increases abnormally due to abnormal operation of the supercharger 18, that is, an abnormality in the supercharger 18 in which an abnormal increase in the supercharging pressure Pchg from the supercharger 18 occurs. The abnormality determining unit 104 determines whether an abnormality has occurred in the supercharger 18, for example, based on a supercharging pressure change rate Rpchg and a supercharging pressure difference ΔPchg. The supercharging pressure change rate Rpchg is a rate of change of the supercharging pressure Pchg (=dPchg/dt) from the supercharger 18, that is, a rate of change or a differential of time. The supercharging pressure difference ΔPchg is a supercharging pressure difference (=Pchg−Pchgtgt) between the supercharging pressure Pchg and the target supercharging pressure Pchgtgt. The supercharging pressure Pchg is a value detected by the supercharging pressure sensor 40, that is, an actual value. The target supercharging pressure Pchgtgt is, for example, a target value of the supercharging pressure Pchg for outputting the target engine torque Tetgt, which is set by the hybrid control unit 102.

The abnormality determining unit 104 determines whether a first abnormality Ab1 in which the supercharging pressure change rate Rpchg is greater than a predetermined change rate Rpchgf has occurred. The predetermined rate of change Rpchgf is, for example, a predetermined threshold value for determining whether there is a likelihood of occurrence of an abnormal increase in the supercharging pressure Pchg. The abnormality determining unit 104 determines whether a second abnormality Ab2 in which the supercharging pressure difference ΔPchg is greater than a predetermined supercharging pressure difference ΔPchgf, that is, a second abnormality Ab2 in which the supercharging pressure Pchg is higher by the predetermined supercharging pressure difference ΔPchgf than the target supercharging pressure Pchgtgt, has occurred. The predetermined supercharging pressure difference ΔPchgf is, for example, a predetermined threshold value for determining whether there is a likelihood of occurrence of an abnormal increase in the supercharging pressure Pchg.

The abnormality determining unit 104 determines whether at least one of the first abnormality Ab1 and the second abnormality Ab2 has occurred. When it is determined that at least one of the first abnormality Ab1 and the second abnormality Ab2 has occurred, the abnormality determining unit 104 determines whether both the first abnormality Ab1 and the second abnormality Ab2 have occurred, that is, whether occurrence of an abnormality in the supercharger 18 is confirmed. When it is determined that occurrence of an abnormality is based on both the first abnormality Ab1 and the second abnormality Ab2, that is, when it is determined that both the first abnormality Ab1 and the second abnormality Ab2 have occurred, the abnormality determining unit 104 determines that an abnormality has occurred in the supercharger 18, that is, confirms occurrence of an abnormality in the supercharger 18. When it is determined that only one of the first abnormality Ab1 and the second abnormality Ab2 has occurred, the abnormality determining unit 104 determines that there is a likelihood of occurrence of an abnormality in the supercharger 18, that is, predicts occurrence of an abnormality in the supercharger 18.

The maximum rotation speed changing unit 106 changes the maximum engine rotation speed Nemax and the maximum MG2 rotation speed Nmmax to a lower rotation-speed side when the abnormality determining unit 104 determines that there is a likelihood of occurrence of an abnormality in the supercharger 18 before the abnormality determining unit 104 determines that an abnormality has occurred in the supercharger 18 than before the abnormality determining unit 104 determines that there is a likelihood of occurrence of an abnormality in the supercharger 18.

Specifically, the maximum rotation speed changing unit 106 selects a normal maximum rotation speed Nmaxn as the maximum rotation speed Nmax of the engine 12, the second rotary machine MG2, or the like at the time of normality before the abnormality determining unit 104 determines that there is a likelihood of occurrence of an abnormality in the supercharger 18, that is, at the time of normality at which the abnormality determining unit 104 determines that neither the first abnormality Ab1 nor the second abnormality Ab2 has occurred. The normal maximum rotation speed Nmaxn is, for example, a predetermined maximum rotation speed Nmax with a margin from the upper-limit rotation speed as described above. The maximum rotation speed changing unit 106 sets an abnormality-prediction maximum rotation speed Nmaxab obtained by changing the normal maximum rotation speed Nmaxn to a lower rotation speed side as the maximum rotation speed Nmax of the engine 12, the second rotary machine MG2, or the like at the time of abnormality prediction at which it is determined that there is a likelihood of occurrence of an abnormality in the supercharger 18.

Referring to FIG. 7, a dotted line in FIG. 7 indicates a feasible area at the time of normality which is set, for example, based on the normal maximum rotation speed Nmaxn. An alternate long and short dash line in FIG. 7 indicates a feasible area at the time of abnormality prediction which is set, for example, based on the abnormality-prediction maximum rotation speed Nmaxab. The feasible area at the time of normality is a feasible area which is set based on the operating point limited area at the time of normality. The feasible area at the time of abnormality prediction is a feasible area which is set based on the operating point limited area at the time of abnormality prediction which is enlarged from the operating point limited area at the time of normality.

When the normal maximum rotation speed Nmaxn is changed to the abnormality-prediction maximum rotation speed Nmaxab on a lower vehicle speed side in a state in which the operating points of the engine 12 and the second rotary machine MG2 are controlled such that the engine rotation speed Ne or the MG2 rotation speed Nm is in the feasible area at the time of normality, at least one of the engine rotation speed Ne and the MG2 rotation speed Nm may be out of the feasible area at the time of abnormality prediction, that is, may exceed the maximum rotation speed Nmax. In this case, the operating point control unit 102d changes the operating point of at least one of the engine 12 and the second rotary machine MG2 such that the engine rotation speed Ne and the MG2 rotation speed Nm are within the feasible area at the time of abnormality prediction, that is, in a range which does not exceed the abnormality-prediction maximum rotation speed Nmaxab.

The operating point control unit 102d performs engine torque decrease control for decreasing the engine torque Te, for example, by performing at least one of control for decreasing the opening of the electronic throttle valve 38 and control for delaying an ignition time. The operating point control unit 102d performs MG2 torque decrease control which is rotary machine torque decrease control for decreasing the MG2 torque Tm on a powering side, for example, by decreasing a powering torque of the second rotary machine MG2 or by generating a regenerative torque of the second rotary machine MG2. The MG2 torque decrease control may include MG2 torque cut control for stopping an output of the MG2 torque Tm. The operating point control unit 102d changes the operating point of at least one of the engine 12 and the second rotary machine MG2 by performing at least one of the engine torque decrease control and the MG2 torque decrease control.

Figure 8:
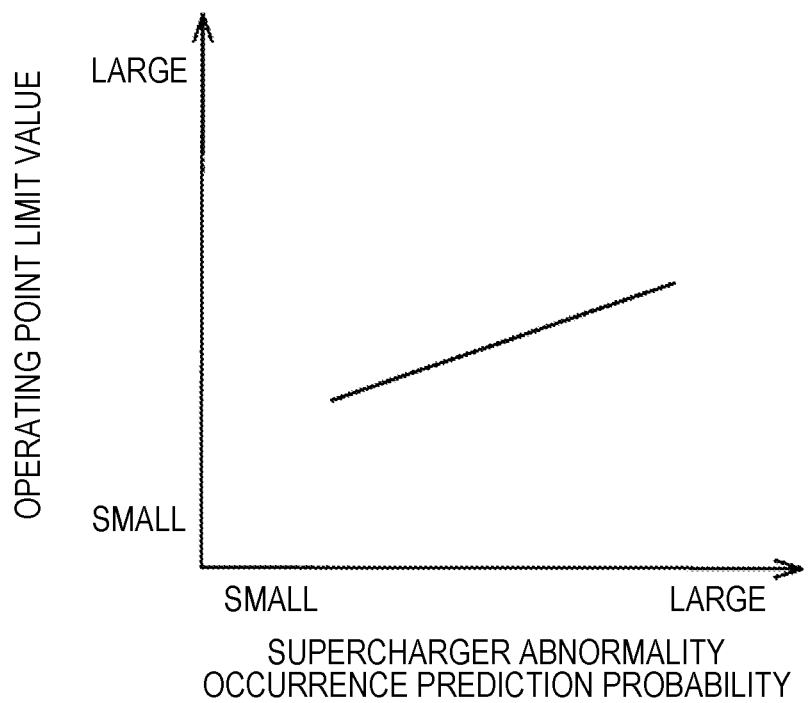
FIG. 8 is a diagram illustrating an example of an operating point limit value which is set based on a supercharger abnormality occurrence prediction probability.

FIG. 8 is a diagram illustrating an example of an operating point limit value which is set based on a supercharger abnormality occurrence prediction probability. The supercharger abnormality occurrence prediction probability is a probability of occurrence of an abnormality in the supercharger 18 being predicted and increases as the likelihood of occurrence of an abnormality in the supercharger 18 increases. The operating point limit value represents a magnitude of enlargement of the operating point limited area at the time of normality, that is, a limited area enlargement value which is used for enlargement of the operating point limited area, at the time of abnormality prediction. That is, the operating point limit value corresponds to a maximum rotation speed change amount ΔNmax which is an amount of change when the maximum engine rotation speed Nemax and the maximum MG2 rotation speed Nmmax are changed to the lower rotation speed side. Accordingly, as the operating point limit value of the engine 12, the second rotary machine MG2, or the like increases, the maximum rotation speed Nmax of the engine 12, the second rotary machine MG2, or the like is set to a lower value. In FIG. 8, the operating point limit value is predetermined to be a greater value as the supercharger abnormality occurrence prediction probability becomes higher. Accordingly, the maximum engine rotation speed Nemax and the maximum MG2 rotation speed Nmmax are set to lower values as the supercharger abnormality occurrence prediction probability becomes higher. Referring to FIG. 8, the maximum rotation speed changing unit 106 sets the maximum rotation speed change amount ΔNmax to be greater as the supercharger abnormality occurrence prediction probability becomes higher, that is, as the likelihood of occurrence of an abnormality in the supercharger 18 becomes higher. The maximum rotation speed changing unit 106 predicts that there is a higher likelihood of occurrence of an abnormality in the supercharger 18 and sets the supercharger abnormality occurrence prediction probability to be a greater value, for example, as the supercharging pressure change rate Rpchg at the time of abnormality prediction increases or as the supercharging pressure difference ΔPchg at the time of abnormality prediction increases.

At the time of abnormality confirmation at which it is determined that an abnormality has occurred in the supercharger 18, the engine rotation speed Ne or the MG2 rotation speed Nm is likely to reach a predetermined upper-limit rotation speed thereof and thus the hybrid control unit 102 curbs an increase in the engine rotation speed Ne or the MG2 rotation speed Nm. Specifically, the engine control unit 102a performs fuel-cut control for stopping supply of fuel to the engine 12 when the abnormality determining unit 104 determines that an abnormality has occurred in the supercharger 18. When the abnormality determining unit 104 determines that an abnormality has occurred in the supercharger 18, the rotary machine control unit 102b may perform the MG2 torque decrease control in addition to the fuel cut control in order to further curb an increase in the MG2 rotation speed Nm.

Since the abnormality-prediction maximum rotation speed Nmaxab is set at the time of abnormality prediction before the time of abnormality confirmation and thus the margin for the predetermined upper-limit rotation speed for the engine rotation speed Ne, the MG2 rotation speed Nm, or the like increases, a temporal margin when an increase in the engine rotation speed Ne, the MG2 rotation speed Nm, or the like is curbed by the fuel-cut control or the like at the time of abnormality confirmation is likely to be secured. Since the margin increases as the supercharger abnormality occurrence prediction probability increases, the temporal margin is more likely to be secured.

Figure 9:
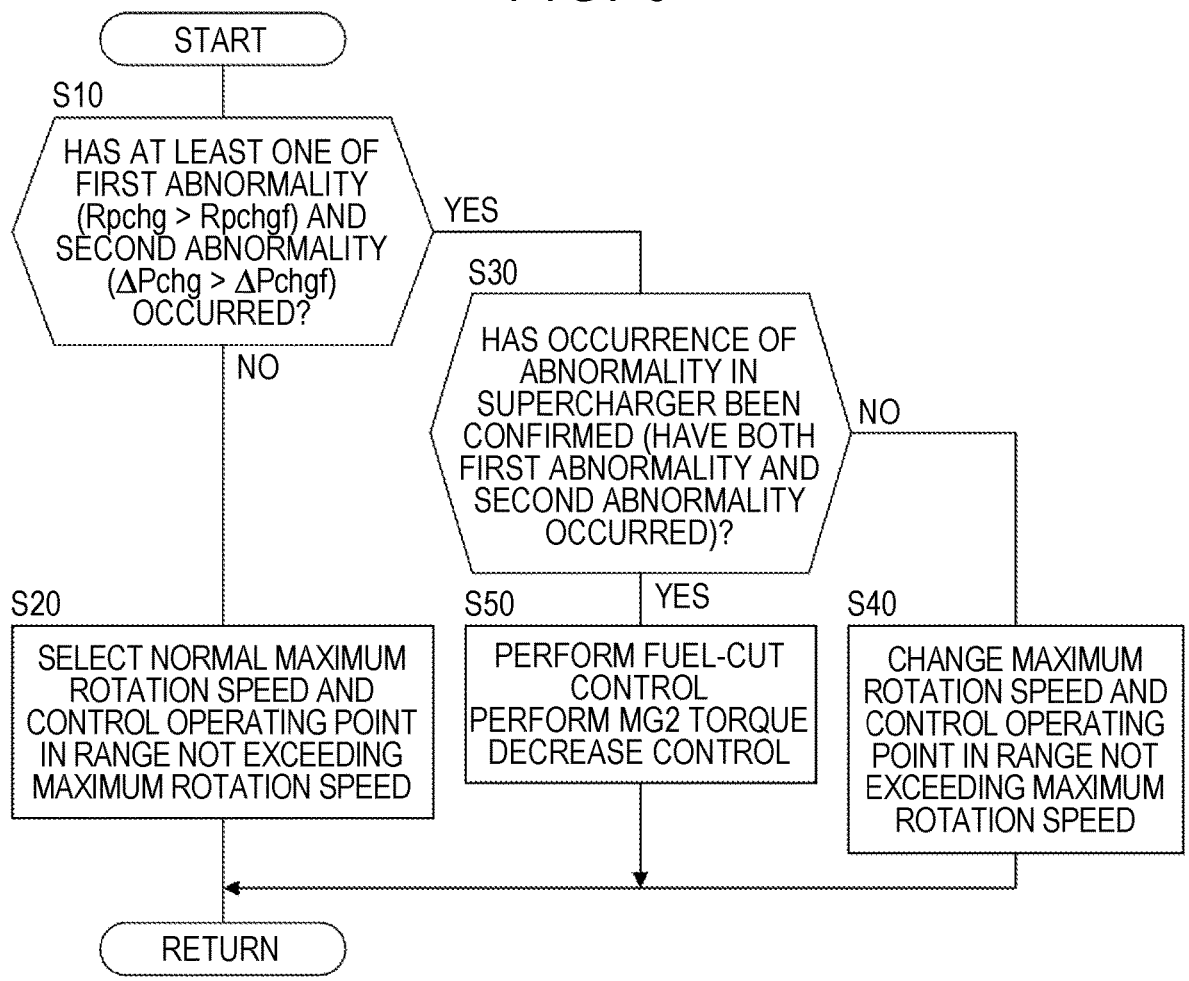
FIG. 9 is a flowchart illustrating a principal part of a control operation of an electronic control unit and illustrating a control operation for curbing a decrease in durability of components due to a high-rotation state of an engine rotation speed or an MG2 rotation speed even when an abnormal increase in a supercharging pressure occurs.

FIG. 9 is a flowchart illustrating a principal part of a control operation of the electronic control unit 100 and illustrating a control operation for curbing a decrease in durability of components due to a high-rotation state of the engine rotation speed Ne or the MG2 rotation speed Nm even when an abnormal increase in the supercharging pressure Pchg has occurred, for example, which is repeatedly performed.

In FIG. 9, first, in Step (the word "step" is omitted below) S10 corresponding to the function of the abnormality determining unit 104, it is determined whether at least one of the first abnormality Ab1 (Rpchg>Rpchgf) and the second abnormality Ab2 (ΔPchg>ΔPchgf) has occurred. When the determination result of S10 is negative, the normal maximum rotation speed Nmaxn is selected as the maximum rotation speed Nmax and the operating points of the engine 12 and the second rotary machine MG2 are controlled such that the engine rotation speed Ne or the MG2 rotation speed Nm is within a range which does not exceed the normal maximum rotation speed Nmaxn thereof in S20 corresponding to the functions of the maximum rotation speed changing unit 106 and the operating point control unit 102d. When the determination result of S10 is positive, it is determined whether occurrence of an abnormality in the supercharger 18 is confirmed, that is, whether both the first abnormality Ab1 and the second abnormality Ab2 have occurred, in S30 corresponding to the function of the abnormality determining unit 104. When the determination result of S30 is negative, the abnormality-prediction maximum rotation speed Nmaxab obtained by changing the normal maximum rotation speed Nmaxn to the lower rotation speed side is set as the maximum rotation speed Nmax in S40 corresponding to the functions of maximum rotation speed changing unit 106 and the operating point control unit 102d. When at least one of the engine rotation speed Ne and the MG2 rotation speed Nm exceeds the abnormality-prediction maximum rotation speed Nmaxab after the maximum rotation speed Nmax is changed, the operating point of at least one of the engine 12 and the second rotary machine MG2 is changed by performing at least one of the engine torque decrease control and the MG2 torque decrease control such that the engine rotation speed Ne and the MG2 rotation speed Nm are within the range which does not exceed the abnormality-prediction maximum rotation speed Nmaxab. When the determination result of S30 is positive, the fuel-cut control is performed in S50 corresponding to the function of the hybrid control unit 102 to curb or prevent an increase in the engine rotation speed Ne and the MG2 rotation speed Nm. The MG2 torque decrease control may be additionally performed.

According to the embodiment described above, when it is determined that there is a likelihood of occurrence of an abnormality in the supercharger 18, the maximum engine rotation speed Nemax and the maximum MG2 rotation speed Nmmax are changed to the lower rotation speed side and the operating points of the engine 12 and the second rotary machine MG2 are controlled such that the engine rotation speed Ne and the MG2 rotation speed Nm are each within the range which does not exceed the changed maximum rotation speed Nmax. Accordingly, even when the supercharger 18 does not operate normally and an abnormal increase in the supercharging pressure Pchg occurs, it is possible to curb a high-rotation state of the engine rotation speed Ne and the MG2 rotation speed Nm. As a result, even when an abnormal increase in the supercharging pressure Pchg occurs, it is possible to curb a decrease in durability of components due to a high-rotation state of the engine rotation speed Ne or the MG2 rotation speed Nm.

According this embodiment, the maximum rotation speed change amount ΔNmax increases as the likelihood of occurrence of an abnormality in the supercharger 18 increases. Accordingly, it is possible to curb excessive limitation of control ranges of the operating points of the engine 12 and the second rotary machine MG2 when the likelihood of occurrence of an abnormality in the supercharger 18 is relatively low, and to appropriately prevent the engine rotation speed Ne and the MG2 rotation speed Nm from reaching a high-rotation state in spite of occurrence of an abnormal increase in the supercharging pressure Pchg when the likelihood of occurrence of an abnormality in the supercharger 18 is relatively high.

According to this embodiment, since the fuel-cut control is performed when it is determined that an abnormality has occurred in the supercharger 18, it is possible to prevent the engine rotation speed Ne and the MG2 rotation speed Nm from reaching a high-rotation state when an abnormality has occurred in the supercharger 18.

According to this embodiment, since the MG2 torque decrease control is additionally performed when it is determined that an abnormality has occurred in the supercharger 18, it is possible to appropriately prevent the MG2 rotation speed Nm from reaching a high-rotation state when an abnormality has occurred in the supercharger 18.

According to this embodiment, it is determined that an abnormality has occurred in the supercharger 18 when both the first abnormality Ab1 and the second abnormality Ab2 have occurred and it is determined that there is a likelihood of occurrence of an abnormality in the supercharger 18 when only one of the first abnormality Ab1 and the second abnormality Ab2 has occurred. Accordingly, it is possible to appropriately determine occurrence of an abnormality in the supercharger 18 such as an abnormal increase in the supercharging pressure Pchg due to abnormal operation of the supercharger 18.

According to this embodiment, the operating point of at least one of the engine 12 and the second rotary machine MG2 is changed by performing at least one of the engine torque decrease control and the MG2 torque decrease control. Accordingly, when at least one of the engine rotation speed Ne and the MG2 rotation speed Nm exceeds the corresponding maximum rotation speed Nmax due to change of the maximum rotation speed Nmax to the lower rotation speed side, it is possible to appropriately control the operating points of the engine 12 and the second rotary machine MG2 such that the engine rotation speed Ne and the MG2 rotation speed Nm are within the range which does not exceed the maximum rotation speed Nmax.

Another embodiment of the present disclosure will be described below. In the following description, elements common to those in the above-mentioned embodiment will be referred to by the same reference signs and description thereof will not be repeated.

In this embodiment, a vehicle 200 which is different from the vehicle 10 described above in the first embodiment and which is illustrated in FIG. 10 is exemplified. FIG. 10 is a diagram schematically illustrating a configuration of a vehicle 200 to which the present disclosure is applied. In FIG. 10, the vehicle 200 is a hybrid vehicle including an engine 202, a first rotary machine MG1, a second rotary machine MG2, a power transmission device 204, driving wheels 206.

The engine 202, the first rotary machine MG1, and the second rotary machine MG2 have the same configurations as the engine 12, the first rotary machine MG1, and the second rotary machine MG2 described above in the first embodiment. The engine 202 is a drive source for travel of the vehicle 200 and an engine torque Te thereof is controlled by causing an electronic control unit 240 which will be described later to control an engine control device 208 including an electronic throttle valve, a fuel injection device, an ignition device, and a waste gate valve which are provided in the vehicle 200. The first rotary machine MG1 and the second rotary machine MG2 are connected to a battery 212 that is a power storage device provided in the vehicle 200 via an inverter 210 provided in the vehicle 200. An MG1 torque Tg and an MG2 torque Tm of the first rotary machine MG1 and the second rotary machine MG2 are controlled by causing the electronic control unit 240 to control the inverter 210.

A power transmission device 204 includes an electrical stepless gear shifting unit 216 and a mechanical stepped gear shifting unit 218 which are arranged in series on a common axis in a case 214 that is a non-rotary member attached to the vehicle body. The electrical stepless gear shifting unit 216 is connected to the engine 202 directly or indirectly via a damper which is not illustrated or the like. The mechanical stepped gear shifting unit 218 is connected to an output side of the electrical stepless gear shifting unit 216. The power transmission device 204 includes a differential gear unit 222 that is connected to an output shaft 220 which is an output rotary member of the mechanical stepped gear shifting unit 218 and a pair of axles 224 that is connected to the differential gear unit 222 or the like. In the power transmission device 204, power which is output from the engine 202 or the second rotary machine MG2 is transmitted to the mechanical stepped gear shifting unit 218 and is transmitted from the mechanical stepped gear shifting unit 218 to the driving wheels 206 via the differential gear unit 222 or the like. The power transmission device 204 having this configuration is suitably used for a vehicle of a front-engine rear-drive (FR) type. In the following description, the electrical stepless gear shifting unit 216 is referred to as a stepless gear shifting unit 216 and the mechanical stepped gear shifting unit 218 is referred to as a stepped gear shifting unit 218. The stepless gear shifting unit 216, the stepped gear shifting unit 218, or the like is disposed to be substantially symmetric with respect to the common axis, and a lower half with respect to the axis is not illustrated in FIG. 10. The common axis is an axis of a crankshaft of the engine 202, a connection shaft 226 connected to the crankshaft, or the like.

The stepless gear shifting unit 216 includes a differential mechanism 230 that is a power split mechanism that mechanically splits power of the engine 202 to the first rotary machine MG1 and an intermediate transmission member 228 which is an output rotary member of the stepless gear shifting unit 216. The first rotary machine MG1 is a rotary machine to which power of the engine 202 is transmitted. The second rotary machine MG2 is connected to the intermediate transmission member 228 in a power-transmittable manner. Since the intermediate transmission member 228 is connected to the driving wheels 206 via the stepped gear shifting unit 218, the second rotary machine MG2 is a rotary machine that is connected to the driving wheels 206 in a power-transmittable manner. The differential mechanism 230 is a differential mechanism that splits and transmits power of the engine 202 to the driving wheels 206 and the first rotary machine MG1. The stepless gear shifting unit 216 is an electrical stepless transmission in which a differential state of the differential mechanism 230 is controlled by controlling the operating state of the first rotary machine MG1. The first rotary machine MG1 is a rotary machine that can control an engine rotation speed Ne, that is, adjust the engine rotation speed Ne.

The differential mechanism 230 is constituted by a single-pinion type planetary gear unit and includes a sun gear S0, a carrier CA0, and a ring gear R0. The engine 202 is connected to the carrier CA0 via the connection shaft 226 in a power-transmittable manner, the first rotary machine MG1 is connected to the sun gear S0 in a power-transmittable manner, and the second rotary machine MG2 is connected to the ring gear R0 in a power-transmittable manner. In the differential mechanism 230, the carrier CA0 serves as an input element, the sun gear S0 serves as a reaction element, and the ring gear R0 serves as an output element.

The stepped gear shifting unit 218 is a stepped transmission constituting a part of a power transmission path between the intermediate transmission member 228 and the driving wheels 206, that is, a mechanical gear shifting mechanism constituting a part of a power transmission path between the stepless gear shifting unit 216 (which is synonymous with the differential mechanism 230) and the driving wheels 206. The intermediate transmission member 228 also serves as an input rotary member of the stepped gear shifting unit 218. Accordingly, the stepped gear shifting unit 218 is an automatic transmission constituting a part of a power transmission path between the engine 202 and the second rotary machine MG2 and the driving wheels 206. The stepped gear shifting unit 218 is, for example, a known planetary gear type automatic transmission including a plurality of planetary gear units such as a first planetary gear unit 232 and a second planetary gear unit 234 and a plurality of engagement devices such as a one-way clutch F1, a clutch C1, a clutch C2, a brake B1, and a brake B2. In the following description, the clutch C1, the clutch C2, the brake B1, and the brake B2 are simply referred to as engagement devices CB when not particularly distinguished.

Each engagement device CB is a hydraulic frictional engagement device which is constituted by a multi-disc or single-disc clutch or brake which is pressed by a hydraulic actuator, a band brake which is tightened by a hydraulic actuator, and the like. The operating state such as an engaged state or a disengaged state of each engagement device CB is switched by changing an engagement torque Tcb which is a torque capacity thereof using controlled engagement oil pressures PRcb of the engagement devices CB which are output from solenoid valves SL1 to SL4 or the like in a hydraulic pressure control circuit 236 provided in the vehicle 200.

In the stepped gear shifting unit 218, rotary elements of the first planetary gear unit 232 and the second planetary gear unit 234 are partially connected to each other directly or indirectly via the engagement devices CB or the one-way clutch F1 or are connected to the intermediate transmission member 228, the case 214, or the output shaft 220. The rotary elements of the first planetary gear unit 232 are a sun gear S1, a carrier CA1, and a ring gear R1, and the rotary elements of the second planetary gear unit 234 are a sun gear S2, a carrier CA2, and a ring gear R2.

In the stepped gear shifting unit 218, one gear stage of a plurality of gear stages with different gear ratios γat (=AT input rotation speed Ni/AT output rotation speed No) is formed by engaging one of a plurality of engagement devices. In this embodiment, a gear stage which is formed in the stepped gear shifting unit 218 is referred to as an AT gear stage. The AT input rotation speed Ni is an input rotation speed of the stepped gear shifting unit 218 and has the same value as a rotation speed of the intermediate transmission member 228 and the same value as an MG2 rotation speed Nm. The AT output rotation speed No is a rotation speed of the output shaft 220 which is an output rotation speed of the stepped gear shifting unit 218 and is also an output rotation speed of a composite transmission 238 which is a combined transmission including the stepless gear shifting unit 216 and the stepped gear shifting unit 218.

In the stepped gear shifting unit 218, for example, as illustrated in an engagement operation table of FIG. 11, four forward AT gear stages including a first AT gear stage ("1st" in the drawing) to a fourth AT gear stage ("4th" in the drawing) are formed as a plurality of AT gear stages. The gear ratio γat of the first AT gear stage is the highest and the gear ratio γat becomes lower in a higher AT gear stage. A reverse AT gear stage ("Rev" in the drawing) is formed, for example, by engagement of the clutch C1 and engagement of the brake B2. That is, for example, the first AT gear stage is formed at the time of reverse travel. The engagement operation table illustrated in FIG. 11 is obtained by collecting relationships between the AT gear stages and the operation states of the plurality of engagement devices. In FIG. 11, "O" denotes engagement, "Δ" denotes engagement at the time of engine braking or at the time of coast downshift of the stepped gear shifting unit 218, and a blank denotes disengagement.

In the stepped gear shifting unit 218, an AT gear stage which is formed according to a driver's operation of an accelerator, a vehicle speed V, or the like is switched, that is, a plurality of AT gear stages are selectively formed, by an electronic control unit 240 which will be described later. For example, in gear shifting control of the stepped gear shifting unit 218, so-called clutch-to-clutch gear shifting in which gear shifting is performed by switching one of the engagement devices CB, that is, gear shifting is performed by switching of the engagement device CB between engagement and disengagement, is performed.

The vehicle 200 further includes a one-way clutch F0. The one-way clutch F0 is a lock mechanism that can fix the carrier CA0 in a non-rotatable manner. That is, the one-way clutch F0 is a lock mechanism that can fix the connection shaft 226 which is connected to the crankshaft of the engine 202 and which rotates integrally with the carrier CA0 to the case 214. In the one-way clutch F0, one member of two members rotatable relative to each other is integrally connected to the connection shaft 226 and the other member is integrally connected to the case 214. The one-way clutch F0 idles in a positive rotating direction which is a rotating direction at the time of operation of the engine 202 and is automatically engaged in a negative rotating direction which is opposite to that at the time of operation of the engine 202. Accordingly, at the time of idling of the one-way clutch F0, the engine 202 is rotatable relative to the case 214. On the other hand, at the time of engagement of the one-way clutch F0, the engine 202 is not rotatable relative to the case 214. That is, the engine 202 is fixed to the case 214 by engagement of the one-way clutch F0. In this way, the one-way clutch F0 permits rotation in the positive rotating direction of the carrier CA0 which is a rotating direction at the time of operation of the engine 202 and prohibits rotation in the negative rotating direction of the carrier CA0. That is, the one-way clutch F0 is a lock mechanism that can permit rotation in the positive rotating direction of the engine 202 and prohibit rotation in the negative rotating direction.

The vehicle 200 further includes an electronic control unit 240 which is a controller including a control device for the vehicle 200 associated with control of the engine 202, the first rotary machine MG1, the second rotary machine MG2, and the like. The electronic control unit 240 has the same configuration as the electronic control unit 100 described above in the first embodiment. The electronic control unit 240 is supplied with various signals which are the same as supplied to the electronic control unit 100. Various command signals which are the same as output from the electronic control unit 100 are output from the electronic control unit 240. The electronic control unit 240 has functions equivalent to the functions of the hybrid control unit 102, the abnormality determining unit 104, and the maximum rotation speed changing unit 106 which are included in the electronic control unit 100. The electronic control unit 240 can realize a control function capable of curbing a decrease in durability of components due to a high-rotation state of the engine rotation speed Ne or the MG2 rotation speed Nm even when an abnormal increase in the supercharging pressure Pchg has occurred, which is the same function as realized by the electronic control unit 100 described above in the first embodiment.

In the vehicle 200, the stepped gear shifting unit 218 is provided in series on the rear stage of the stepless gear shifting unit 216. Accordingly, when the AT gear stage of the stepped gear shifting unit 218 is switched at a certain vehicle speed V, the rotation speed of the ring gear R0 which is the output rotation speed of the stepless gear shifting unit 216 changes. Then, a feasible area of the engine rotation speed Ne changes based on a difference between the AT gear stages in the stepped gear shifting unit 218.

Figure 12:
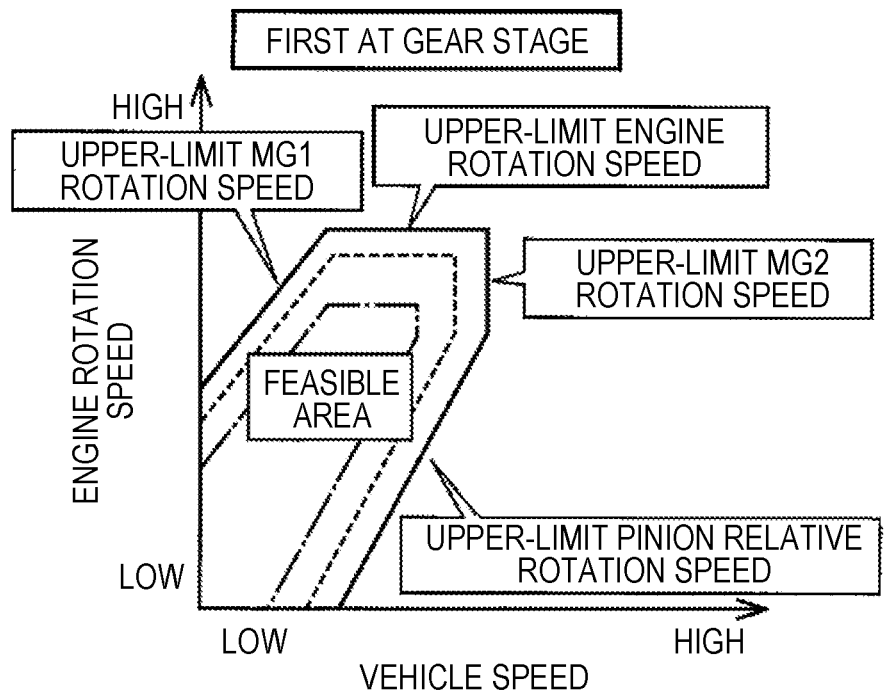
FIG. 12 is a diagram illustrating an example of a feasible area of an engine rotation speed in the vehicle illustrated in FIG. 10 at a first AT gear stage.
Figure 13:
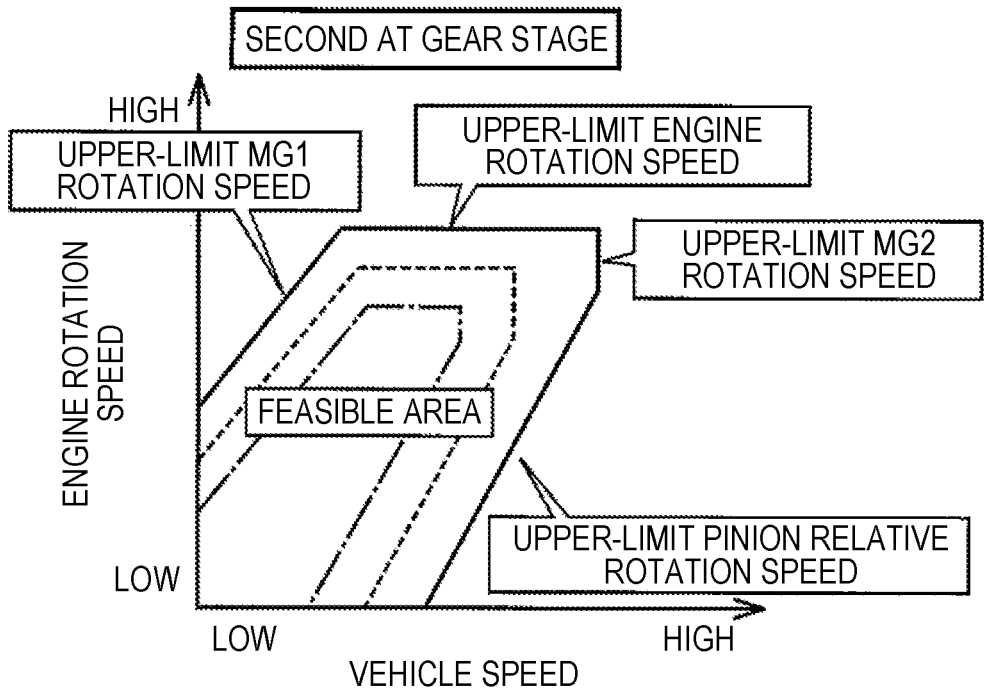
FIG. 13 is a diagram illustrating an example of a feasible area of an engine rotation speed in the vehicle illustrated in FIG. 10 at a second AT gear stage.
Figure 14:
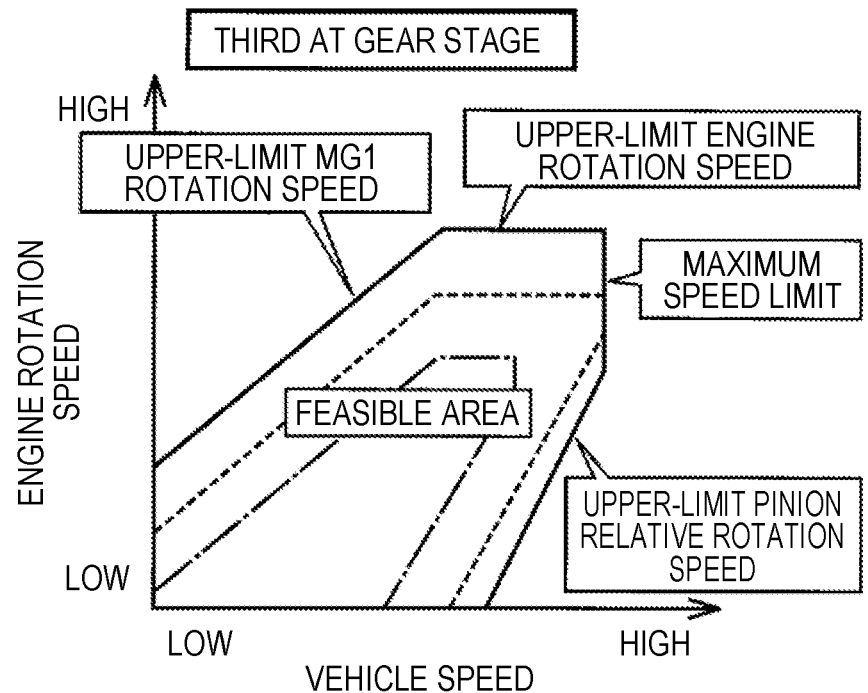
FIG. 14 is a diagram illustrating an example of a feasible area of an engine rotation speed in the vehicle illustrated in FIG. 10 at a third AT gear stage.
Figure 15:
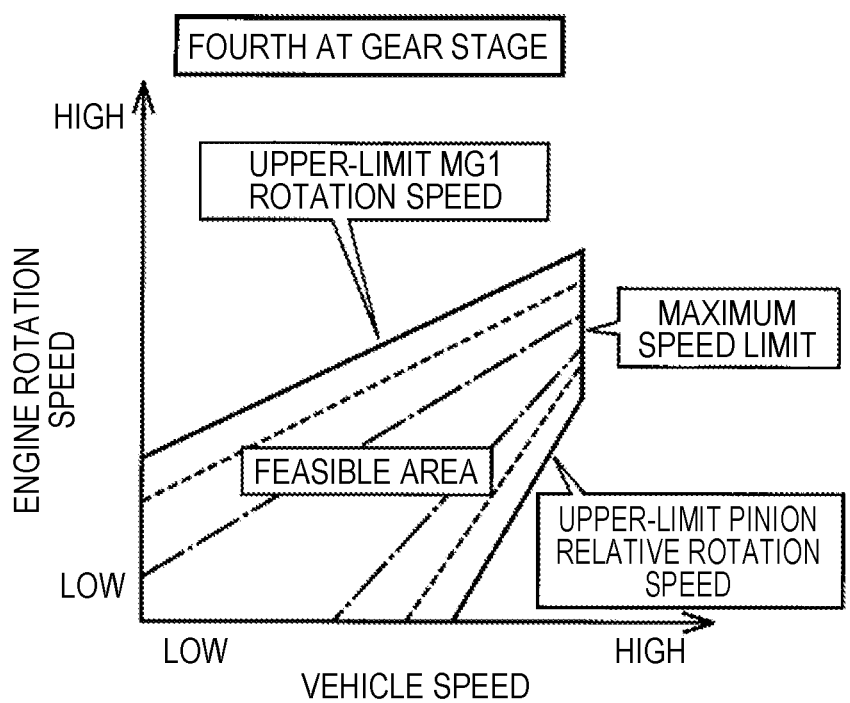
FIG. 15 is a diagram illustrating an example of a feasible area of an engine rotation speed in the vehicle illustrated in FIG. 10 at a fourth AT gear stage.

FIGS. 12, 13, 14, and 15 are diagrams illustrating an example of a feasible area of the engine rotation speed Ne on a two-dimensional coordinate system with the vehicle speed V and the engine rotation speed Ne as variables and illustrating an embodiment other than illustrated in FIG. 7 in the first embodiment. FIG. 12 illustrates a case in which the stepped gear shifting unit 218 is set to the first AT gear stage, FIG. 13 illustrates a case in which the stepped gear shifting unit 218 is set to the second AT gear stage, FIG. 14 illustrates a case in which the stepped gear shifting unit 218 is set to the third AT gear stage, and FIG. 15 illustrates a case in which the stepped gear shifting unit 218 is set to the fourth AT gear stage. In FIGS. 12, 13, 14, and 15, the basic idea for defining the feasible area of the engine rotation speed Ne is the same as described above with reference to FIG. 7. As the stepped gear shifting unit 218 is set to a higher AT gear stage at a certain vehicle speed V, the rotation speed of the ring gear R0 which is the output rotation speed of the stepless gear shifting unit 216 becomes lower. Accordingly, in a low area of the engine rotation speed Ne, the feasible area of the engine rotation speed Ne which is defined according to the upper limit of the relative rotation speed of the second pinion P2 is enlarged to a higher vehicle speed side at a higher AT gear stage. At the third AT gear stage or at the fourth AT gear stage, the rotation speed of the ring gear R0 decreases and thus the feasible area of the engine rotation speed Ne is not defined according to the upper-limit MG2 rotation speed Nmlim, but the feasible area of the engine rotation speed Ne is defined according to a maximum vehicle speed of the vehicle 200. When the AT gear stage of the stepped gear shifting unit 218 is on a high side and the rotation speed of the ring gear R0 decreases, the MG1 rotation speed Ng is likely to increase. Accordingly, in a low vehicle speed area, limitation on a high rotation side of the feasible area of the engine rotation speed Ne which is defined according to the upper-limit MG1 rotation speed Nglim increases as the AT gear stage becomes higher.

As described above, the feasible area of the engine rotation speed Ne is changed with shift of the AT gear stage in the stepped gear shifting unit 218. Accordingly, when at least one of the engine rotation speed Ne and the MG2 rotation speed Nm exceeds the maximum rotation speed Nmax, there is a likelihood that the engine rotation speed Ne and the MG2 rotation speed Nm will be within the range which does not exceed the maximum rotation speed Nmax due to gear shifting in the stepped gear shifting unit 218.

Referring to FIGS. 12 to 15, for example, at the time of travel at the first AT gear stage or the second AT gear stage, the MG2 rotation speed Nm is more likely to exceed the maximum MG2 rotation speed Nmmax on the high vehicle speed side than at the time of travel at the third AT gear stage or the fourth AT gear stage. Therefore, for example, when the MG2 rotation speed Nm exceeds the abnormality-prediction maximum rotation speed Nmaxab at the time of travel at the first AT gear stage or the second AT gear stage, the stepped gear shifting unit 218 is shifted up to the third AT gear stage or the fourth AT gear stage. Accordingly, the operating point of at least the second rotary machine MG2 is changed such that the engine rotation speed Ne and the MG2 rotation speed Nm are within the range which does not exceed the abnormality-prediction maximum rotation speed Nmaxab. For example, when the engine rotation speed Ne increases at the time of travel at the fourth AT gear stage, the MG1 rotation speed Ng is more likely to exceed the maximum MG1 rotation speed Ngmax than at the time of travel at the third AT gear stage or the second AT gear stage. Therefore, for example, when the MG1 rotation speed Ng exceeds the maximum MG1 rotation speed Ngmax at the time of travel at the fourth AT gear stage, that is, when the engine rotation speed Ne exceeds the abnormality-prediction maximum rotation speed Nmaxab, the stepped gear shifting unit 218 is shifted down to the third AT gear stage or the second AT gear stage. Accordingly, the operating point of at least the second rotary machine MG2 is changed such that the engine rotation speed Ne and the MG2 rotation speed Nm are within the range which does not exceed the abnormality-prediction maximum rotation speed Nmaxab.

The electronic control unit 100 (particularly, the operating point control unit 102d) described in the first embodiment changes the operating point of at least one of the engine 12 and the second rotary machine MG2 by performing at least one of the engine torque decrease control and the MG2 torque decrease control (see S40 in FIG. 9). In this embodiment, the electronic control unit 240 changes the operating point of at least one of the engine 12 and the second rotary machine MG2 by performing at least one of the engine torque decrease control, the MG2 torque decrease control, and gear shifting control for shifting the stepped gear shifting unit 218.

Figure 16:
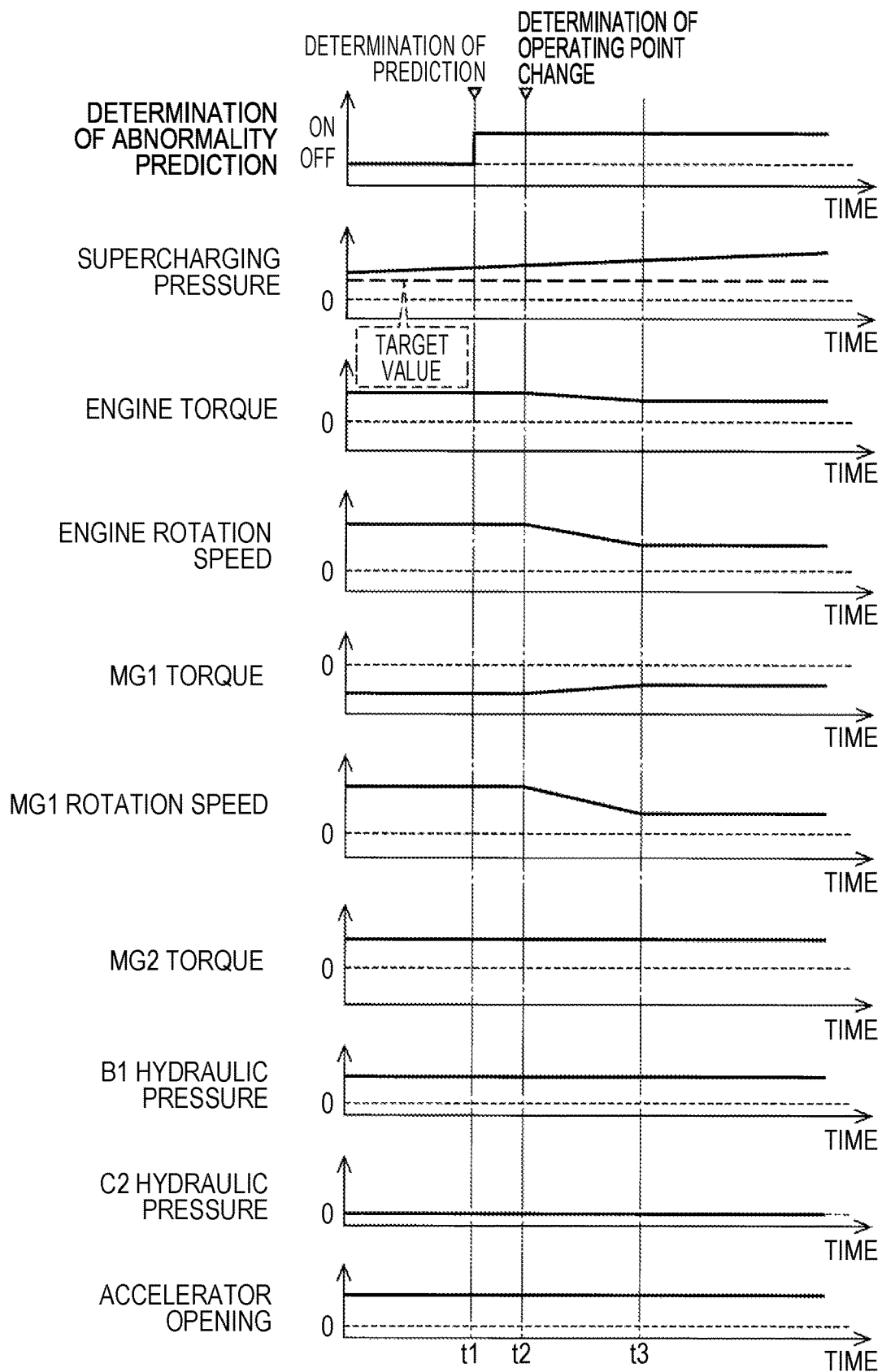
FIG. 16 is a diagram illustrating an example of a timing chart when the control operation illustrated in the flowchart of FIG. 9 is performed in the vehicle illustrated in FIG. 10.

FIG. 16 is a diagram illustrating an example of a timing chart when the control operation illustrated in the flowchart of FIG. 9 according to the first embodiment is performed in the vehicle 200. FIG. 16 is a diagram illustrating an example in which the operating point of the engine 12 is changed at the time of abnormality prediction. In FIG. 16, time point t1 indicates a time point at which occurrence of an abnormality in the supercharger 18 is predicted and an abnormality prediction determination flag is set to ON by determining that the second abnormality Ab2 has occurred because the supercharging pressure difference ΔPchg is greater than a predetermined supercharging pressure difference ΔPchgf. When the abnormality prediction determination flag is set to ON, the feasible area illustrated in FIGS. 12 to 15 is set to the feasible area at the time of abnormality prediction (see the alternate long and short dash line) which is smaller than the normal feasible area (see the dotted line). In this embodiment, for example, when the engine rotation speed Ne is outside of the feasible area at the time of abnormality prediction, it is determined that the operating point of the engine 12 is to be changed (see time point t2), and the engine torque Te is decreased and the engine rotation speed Ne is decreased such that the engine rotation speed Ne is within the feasible area at the time of abnormality prediction (see time points t2 to t3). At this time, the MG1 rotation speed Ng is decreased by feedback control in the first rotary machine MG1. In this embodiment, the MG2 rotation speed Nm is not decreased, but the MG2 rotation speed Nm can be decreased to the operating point of the second rotary machine MG2 which is separated from an area in which the MG2 rotation speed Nm is in a high-rotation state, for example, by upshifting the stepped gear shifting unit 218 when the MG2 rotation speed Nm is outside of the feasible area at the time of abnormal prediction. By changing the operating point of at least one of the engine 12 and the second rotary machine MG2, it is possible to curb an increase in the rotation speeds of the elements of the power transmission device 304 even when an abnormal increase in the supercharging pressure Pchg actually occurs. For example, it is possible to secure a temporal margin until the increase in the rotation speed is curbed by the fuel-cut control or the MG2 torque decrease control at the time of abnormality confirmation.

According to the embodiment described above, the same advantages as in the first embodiment are obtained.

Figure 17:
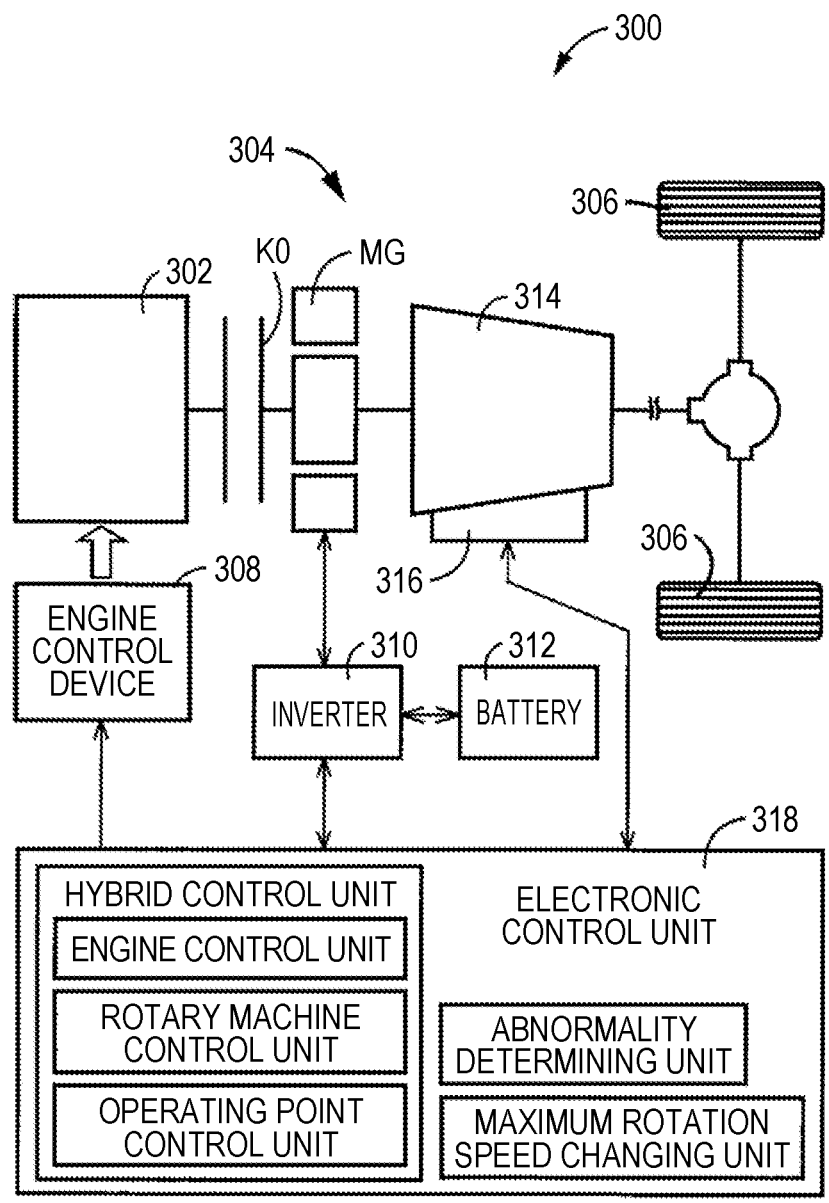
FIG. 17 is a diagram schematically illustrating a configuration of a vehicle to which the present disclosure is applied and which is different from the vehicle illustrated in FIG. 1 or 10.

In this embodiment, a vehicle 300 which is different from the vehicle 10 described above in the first embodiment and which is illustrated in FIG. 17 is exemplified. FIG. 17 is a diagram schematically illustrating a configuration of a vehicle 300 to which the present disclosure is applied. In FIG. 17, the vehicle 300 is a hybrid vehicle including an engine 302, a rotary machine MG, a power transmission device 304, and driving wheels 306.

The engine 302 has the same configuration as the engine 12 described above in the first embodiment. An engine torque Te of the engine 302 is controlled by causing an electronic control unit 318 which will be described later to control an engine control device 308 such as an electronic throttle valve, a fuel injection device, an ignition device, and a waste gate valve which are provided in the vehicle 300.

The rotary machine MG is a rotary electric machine having a function of an electric motor and a function of a power generator and is called a motor generator. The rotary machine MG is a rotary machine that is connected to the driving wheels 306 via the power transmission device 304 in a power-transmittable manner. The rotary machine MG is connected to a battery 312 that is a power storage device provided in the vehicle 300 via an inverter 310 provided in the vehicle 300. Regarding the rotary machine MG, an MG torque Tmg which is an output torque of the rotary machine MG is controlled by causing the electronic control unit 318 which will be described later to control the inverter 310.

The power transmission device 304 includes a clutch K0 and an automatic transmission 314. An input rotary member of the automatic transmission 314 is connected to the engine 302 via the clutch K0 and is directly connected to the rotary machine MG. In the power transmission device 304, power of the engine 302 is transmitted to the driving wheels 306 sequentially via the clutch K0, the automatic transmission 314, and the like and power of the rotary machine MG is transmitted to the driving wheels 306 via the automatic transmission 314 and the like. The engine 302 and the rotary machine MG are power sources for travel of the vehicle 300 that are connected to the driving wheels 306 in a power-transmittable manner.

The clutch K0 is a hydraulic frictional engagement device that connects or disconnects a power transmission path between the engine 302 and the driving wheels 306. The automatic transmission 314 is, for example, a known planetary gear type automatic transmission including a plurality of planetary gear units or a plurality of engagement devices similarly to the stepped gear shifting unit 218 described above in the second embodiment. In the automatic transmission 314, one gear stage of a plurality of gear stages is formed by causing a hydraulic pressure control circuit 316 which is provided in the vehicle 300 and which is driven by the electronic control unit 318 which will be described later to control engagement oil pressures of the plurality of engagement devices.

The vehicle 300 can perform motor-driven travel in which electric power from the battery 312 is used and only the rotary machine MG is used as the power source for travel in a state in which the clutch K0 is disengaged and operation of the engine 302 is stopped. The vehicle 300 can perform hybrid travel in which the engine 302 operates in a state in which the clutch K0 is engaged and at least the engine 302 is used as the power source for travel.

The vehicle 300 further includes the electronic control unit 318 which is a controller including a control device for the vehicle 300 associated with control of the engine 302, the rotary machine MG, and the like. The electronic control unit 318 has the same configuration as the electronic control unit 100 described above in the first embodiment. The electronic control unit 318 is supplied with various signals which are the same as those supplied to the electronic control unit 100. Various command signals which are the same as those output from the electronic control unit 100 are output from the electronic control unit 318. The electronic control unit 318 has functions equivalent to the functions of the hybrid control unit 102, the abnormality determining unit 104, and the maximum rotation speed changing unit 106 which are included in the electronic control unit 100. The electronic control unit 318 can realize a control function of curbing a decrease in durability of components due to a high-rotation state of the engine rotation speed Ne or the rotation speed of the rotary machine MG even when an abnormal increase in the supercharging pressure Pchg has occurred, which is the same function as realized by the electronic control unit 100 described above in the first embodiment.

Since the automatic transmission 314 constituting a part of the power transmission path between the engine 302 and the rotary machine MG and the driving wheels 306 is provided in the vehicle 300, the engine rotation speed Ne or the rotation speed of the rotary machine MG can be changed with shift of the gear stage in the automatic transmission 314. Accordingly, in this embodiment, similarly to the electronic control unit 240 described above in the second embodiment, the electronic control unit 318 changes the operating point of at least one of the engine 302 and the rotary machine MG by performing at least one of the engine torque decrease control, rotary machine torque decrease control for decreasing the MG torque Tmg, and gear shifting control for shifting the gear stage in the automatic transmission 314.

As described above, the same advantages as in the first embodiment are obtained in this embodiment.

While embodiments of the present disclosure have been described above in detail with reference to the accompanying drawings, the present disclosure can be applied to other aspects.

For example, in the first embodiment, it is determined whether an abnormality has occurred in the supercharger 18 based on the supercharging pressure change rate Rpchg and the supercharging pressure difference ΔPchg, but the applicable embodiment is not limited to this aspect. For example, it may be determined whether an abnormality has occurred in the supercharger 18 based on only the supercharging pressure change rate Rpchg or based on only the supercharging pressure difference ΔPchg. Specifically, occurrence of an abnormality in the supercharger 18 may be predicted when it is determined that the first abnormality Ab1 in which the supercharging pressure change rate Rpchg is greater than a predetermined rate of change Rpchgf has occurred, and occurrence of an abnormality in the supercharger 18 may be confirmed when the supercharging pressure change rate Rpchg at the time of abnormality prediction is greater than a predetermined second rate of change which is greater than the predetermined rate of change Rpchgf. The same is true of the case based on only the supercharging pressure difference ΔPchg. That is, occurrence of an abnormality in the supercharger 18 such as an abnormal increase in the supercharging pressure Pchg with abnormal operation of the supercharger 18 may be determined based on at least one of the supercharging pressure change rate Rpchg and the supercharging pressure difference ΔPchg. Alternatively, occurrence of an abnormality in the supercharger 18 may be determined based on a rate of change of the rotation speed of the compressor 18c (=rotation speed of the turbine 18t).

In the first embodiment, the vehicle 10 may be a vehicle which does not include the gear shifting unit 58 and in which the engine 12 is connected to the differential unit 60 like the vehicle 200. The differential unit 60 may be a mechanism in which a differential operation can be limited by control of a clutch or brake connected to the rotary elements of the second planetary gear mechanism 82. The second planetary gear mechanism 82 may be a double pinion type planetary gear unit. The second planetary gear mechanism 82 may be a differential mechanism including four or more rotary elements by connection between a plurality of planetary gear units. The second planetary gear mechanism 82 may be a differential gear mechanism in which the first rotary machine MG1 and the drive gear 74 are connected to the pinion which is rotationally driven by the engine 12 and a pair of bevel gears engaging with the pinion, respectively. The second planetary gear mechanism 82 may be a mechanism with a configuration in which some rotary elements of two or more planetary gear units are connected to each other and the engine, the rotary machine, and the driving wheels are connected to the rotary elements of such planetary gear units in a power-transmittable manner.

In the second embodiment, the one-way clutch F0 is exemplified as a lock mechanism that can fix the carrier CA0 in a non-rotatable manner, but the applicable embodiment is not limited to the aspect. This lock mechanism may be an engagement device such as an engaging clutch, a hydraulic frictional engagement device such as a clutch or a brake, a dry engagement device, an electromagnetic frictional engagement device, or a magnetic powder type clutch which selectively connects the connection shaft 226 and the case 214. Alternatively, the vehicle 200 does not have to include the one-way clutch F0.

In the second embodiment, the stepped gear shifting unit 218 is exemplified above as the automatic transmission constituting a part of the power transmission path between the differential mechanism 230 and the driving wheels 206, but the applicable embodiment is not limited to the aspect. The automatic transmission may be an automatic transmission such as a synchromesh parallel biaxial automatic transmission, a known dual clutch transmission (DCT) with two input shafts as the synchromesh parallel biaxial automatic transmission, or a known belt type stepless transmission. The same is true of the automatic transmission 314 of the vehicle 300 according to the third embodiment.

In the embodiments described above, a mechanical pump type supercharger that is rotationally driven by an engine or an electric motor may be provided in addition to or instead of the exhaust turbine type supercharger 18. The supercharger 18 may include an actuator, for example, an electric motor, that can control the rotation speed of the compressor 18c.

The above embodiments are merely exemplary and the present disclosure can be embodied in various aspects which have been subjected to various modifications and improvements based on knowledge of those skilled in the art.

What is claimed is:

1. A control device for a hybrid vehicle including an engine with a supercharger that serves as a power source for travel and a rotary machine that is connected to driving wheels in a power-transmittable manner, the control device comprising:
    an electronic control unit (ECU) including a processor (CPU), a RAM, a ROM, and an input and output interface, and the CPU performs various types of control for the hybrid vehicle by performing signal processing in accordance with a program which is stored in the ROM in advance while using a temporary storage function of the RAM, the ECU configured to:
    control operating points of the engine and the rotary machine such that a rotation speed of the engine is within a range which does not exceed a maximum rotation speed of the engine with a margin of the rotation speed of the engine from a predetermined upper-limit rotation speed of the engine and a rotation speed of the rotary machine is within a range which does not exceed a maximum rotation speed of the rotary machine with a margin of the rotation speed of the rotary machine from a predetermined upper-limit rotation speed of the rotary machine;

determine whether an abnormality has occurred in the supercharger; and change the maximum rotation speed of the engine and the maximum rotation speed of the rotary machine to a lower rotation speed side when it is determined that there is a likelihood of occurrence of an abnormality in the supercharger before it is determined that an abnormality has occurred in the supercharger.

2. The control device for a hybrid vehicle according to claim 1, wherein the ECU is further configured to increase an amount of change for changing the maximum rotation speed of the engine and the maximum rotation speed of the rotary machine to the lower rotation speed side as the likelihood of occurrence of an abnormality in the supercharger increases.

3. The control device for a hybrid vehicle according to claim 1, wherein the ECU is further configured to perform fuel-cut control for stopping supply of fuel to the engine when it is determined that an abnormality has occurred in the supercharger.

4. The control device for a hybrid vehicle according to claim 3, wherein the ECU is further configured to perform rotary machine torque decrease control for decreasing an output torque of the rotary machine when it is determined that an abnormality has occurred in the supercharger.

5. The control device for a hybrid vehicle according to claim 1, wherein the ECU is further configured to determine whether an abnormality has occurred in the supercharger based on at least one of a rate of change of a supercharging pressure from the supercharger and a supercharging pressure difference between the supercharging pressure and a target value of the supercharging pressure.

6. The control device for a hybrid vehicle according to claim 5, wherein ECU is further configured to determine whether an abnormality has occurred in the supercharger based on the rate of change of the supercharging pressure and the supercharging pressure difference, and wherein the ECU is further configured to determine whether a first abnormality in which the rate of change of the supercharging pressure exceeds a predetermined rate of change has occurred and whether a second abnormality in which the supercharging pressure difference exceeds a predetermined supercharging pressure difference has occurred, to determine that an abnormality has occurred in the supercharger when it is determined that both the first abnormality and the second abnormality have occurred, and to determine that there is a likelihood of occurrence of an abnormality in the supercharger when it is determined that only one of the first abnormality and the second abnormality has occurred.

7. The control device for a hybrid vehicle according to claim 1, wherein the ECU is further configured to change the operating point of at least one of the engine and the rotary machine such that the rotation speed of the engine and the rotation speed of the rotary machine are within a range which does not exceed the corresponding maximum rotation speeds when at least one of the rotation speed of the engine and the rotation speed of the rotary machine exceeds the corresponding maximum rotation speed due to change of the maximum rotation speed of the engine and the maximum rotation speed of the rotary machine to the lower rotation speed side, and wherein the ECU is further configured to change the operating point of at least one of the engine and the rotary machine by performing at least one of engine torque decrease control for decreasing an output torque of the engine, rotary machine torque decrease control for decreasing an output torque of the rotary machine, and gear shifting control for shifting an automatic transmission constituting a part of a power transmission path between the engine and the rotary machine and the driving wheels.

* * * * *